United States Patent
Cheng et al.

(10) Patent No.: US 11,423,531 B2
(45) Date of Patent: Aug. 23, 2022

(54) IMAGE-RECOGNITION APPARATUS, IMAGE-RECOGNITION METHOD, AND NON-TRANSITORY COMPUTER-READABLE STORAGE MEDIUM THEREOF

(71) Applicant: Wistron Corp., New Taipei (TW)

(72) Inventors: Chih-Wei Cheng, New Taipei (TW); Tsai-Sheng Shen, New Taipei (TW); Kuang-Yu Wang, New Taipei (TW)

(73) Assignee: WISTRON CORP., New Taipei (TW)

( * ) Notice: Subject to any disclaimer, the term of this patent is extended or adjusted under 35 U.S.C. 154(b) by 229 days.

(21) Appl. No.: 16/885,594

(22) Filed: May 28, 2020

(65) Prior Publication Data

US 2021/0027444 A1    Jan. 28, 2021

Related U.S. Application Data

(60) Provisional application No. 62/877,375, filed on Jul. 23, 2019.

(30) Foreign Application Priority Data

Apr. 15, 2020   (TW) ................................ 109112603

(51) Int. Cl.
*G06K 9/62* (2022.01)
*G06T 7/00* (2017.01)
(Continued)

(52) U.S. Cl.
CPC ............ *G06T 7/001* (2013.01); *G06K 9/6267* (2013.01); *G06N 20/00* (2019.01); *G06V 10/443* (2022.01)

(58) Field of Classification Search
CPC ........... G06T 7/001; G06T 2207/20081; G06T 2207/30141; G06T 2207/30148;
(Continued)

(56) References Cited

U.S. PATENT DOCUMENTS 10,140,553 B1 * 11/2018 Vasisht ................ G06N 3/0481
10,628,935 B2 *  4/2020 Zhang .................. G06T 7/0006
(Continued)

FOREIGN PATENT DOCUMENTS

AU      2002320676 B2 *  3/2005    ......... H04N 1/00167
CN         104677914 A  *  6/2015
(Continued)

OTHER PUBLICATIONS

Announcing stack overflow documentation, Sep. 2, 2016, pp. 1-2 (Year: 2016).*
(Continued)

*Primary Examiner* — Jayesh A Patel
(74) *Attorney, Agent, or Firm* — McClure, Qualey & Rodack, LLP

(57) ABSTRACT

An image-recognition method is provided. The method includes the following steps: receiving a plurality of check-point images, and classifying the check-point images into a plurality of groups; classifying the check-point images in each group into a plurality of types to generate first structured data, wherein the first structured data includes a first layer and a second layer, and the first layer indicates the groups in different statuses, the second layer is located with directories of the first layer, and the types in each group of the second layer indicate different components in a status corresponding to each group; and balancing a number of the check-point images in each type of each group in the first structured data to generate second structured data, wherein the second structured data is used to train an AI model for image recognition.

15 Claims, 14 Drawing Sheets

(51) Int. Cl.
*G06N 20/00* (2019.01)
*G06V 10/44* (2022.01)

(58) Field of Classification Search
CPC .......... G06T 7/11; G06T 2207/10004; G06K 9/6267; G06K 9/627; G06K 9/00; G06N 20/00; G06N 3/08; G06V 10/443; G06V 20/00; G06V 30/18019; G01N 21/8851; G01N 2021/8854; G01N 2021/8887
See application file for complete search history.

(56) References Cited

U.S. PATENT DOCUMENTS

| | | | | |
|---|---|---|---|---|
| 10,983,478 | B2* | 4/2021 | Cheng | G03H 1/0866 |
| 2019/0138786 | A1* | 5/2019 | Trenholm | G06K 9/6255 |
| 2019/0147586 | A1* | 5/2019 | Ikeda | G06T 7/0004 |
| | | | | 382/157 |
| 2019/0205620 | A1* | 7/2019 | Yi | G06K 9/6256 |
| 2019/0370661 | A1* | 12/2019 | Kwon | G06N 3/084 |
| 2020/0210783 | A1* | 7/2020 | Okuno | G06K 9/6265 |
| 2020/0226420 | A1* | 7/2020 | Shaubi | G06K 9/6223 |
| 2020/0311557 | A1* | 10/2020 | Jin | G06N 5/003 |
| 2020/0342328 | A1* | 10/2020 | Revaud | G06N 3/0472 |
| 2021/0166374 | A1* | 6/2021 | Banno | G06K 9/628 |

FOREIGN PATENT DOCUMENTS

| | | | | |
|---|---|---|---|---|
| CN | 104677914 A | | 6/2015 | |
| CN | 106530284 A | * | 3/2017 | ............. G06N 3/08 |
| CN | 106530284 A | | 3/2017 | |
| CN | 109190643 A | | 1/2019 | |
| TW | 1664586 B | * | 3/2018 | |
| TW | I664586 B | | 7/2019 | |

OTHER PUBLICATIONS

Convolutional Neural Network for Wafer Surface Defect Classification and the Detection of Unknown Defect Class, Sejune Cheon et al., IEEE, May 2, 2019, pp. 163-170 (Year: 2019).*
Wafer Map Defect Pattern Classification and Image Retrieval Using Convolutional Neural Network, Takeshi Nakazawa et al., IEEE, May 2, 2018, pp. 309-314 (Year: 2018).*
Classifying Defects in Topography Images of Silicon Wafers, Corinna Kofler et al, IEEE, 2017, pp. 3646-3657 (Year: 2017).*
AI on edge device for laser chip defect detection, Dennis Hou et al., IEEE, 2019, pp. 0247-0251 (Year: 2019).*
Classification of Mixed-Type Defect Patterns in Wafer Bin Maps Using Convolutional Neural Networks, Kiryong Kyeong et al., IEEE, 2018, pp. 305-402 (Year: 2018).*
Indian language office action dated Jul. 20, 2021, issued in application No. IN 202024030016 (including English language translation).
Chinese language office action dated Jan. 29, 2021, issued in application No. TW 109112604.
Non-Final Office Action dated Dec. 21, 2021, issued in U.S. Appl. No. 16/885,576.
Chinese language office action dated May 10, 2021, issued in application No. TW 109112603.
Indian language office action dated Sep. 15, 2021, issued in application No. IN 202024030047 (including English language translation).
Patent Application filed in corresponding Indian application No. IN 202024030016, published Jan. 29, 2021.

* cited by examiner

IMAGE-RECOGNITION APPARATUS, IMAGE-RECOGNITION METHOD, AND NON-TRANSITORY COMPUTER-READABLE STORAGE MEDIUM THEREOF

CROSS REFERENCE TO RELATED APPLICATIONS

This application claims the benefit of U.S. Provisional Application No. 62/877,375, filed Jul. 23, 2019, and this application also claims priority of Taiwan Patent Application No. 109112603, filed on Apr. 15, 2020, the entirety of which are incorporated by reference herein.

BACKGROUND OF THE DISCLOSURE

Field of the Disclosure

The present disclosure relates to automated optical inspection, and, in particular, to an image-recognition apparatus, an image-recognition method, and a non-transitory computer-readable storage medium thereof.

Description of the Related Art

Automated optical inspection (AOI) is a common representative method in industrial processes that can be used, for example, to inspect to-be-tested items such as printed circuit boards (PCBs), flat display panels, semiconductor devices, electronic products, optical apparatuses, mechanical mechanisms, molds, etc. For example, the AOI system can use optical instruments to obtain the surface status of the finished product, and then use computer image-processing technology to detect defects such as foreign objects or abnormal patterns. Because it is a non-contact inspection, it can check semi-finished products at the intermediate node of the production line. For example, bare PCBs and assembled PCBs can be regarded as intermediate nodes.

The automatic optical inspection system can be used in the manufacturing or assembly process of the to-be-tested object to check different features of the to-be-tested object or semi-finished product, where the features may be but not limited to, integrity (e.g., fracture, continuity, and crack) and size of the conductor (e.g., wires), size and position of the insulator or substrate, size and position of holes, size and position of vias, conductor pitch, line width and length, solder condition, component position, solder joint defects, etc.

However, the conventional AOI system will set quite strict judgement condition to exclude unqualified products, but many qualified products are judged as defective by the conventional AOI system in the aforementioned process. When manufacturing a large number of products on the factory side, there is no effective method to detect products that are mistakenly judged as defective.

BRIEF SUMMARY OF THE DISCLOSURE

A detailed description is given in the following embodiments with reference to the accompanying drawings.

In an exemplary embodiment, a computer program product comprising a non-transitory computer-readable storage medium storing an artificial-intelligence image-recognition program which is executed by a computer to cause the computer to function as: an image-labeling module, configured to receive a plurality of check-point images, and classify the check-point images into a plurality of groups; an image-classification module, configured to classify the check-point images in each group into a plurality of types to generate first structured data, wherein the first structured data comprises a first layer and a second layer, and the first layer indicates the groups in different statuses, the second layer is located with directories of the first layer, and the types in each group of the second layer indicate different components in a status corresponding to each group; and an image-generating module, configured to balance a number of check-point images in each type of each group in the first structured data to generate second structured data, wherein the second structured data is used to train an AI model for image recognition.

In some embodiments, the image-recognition apparatus further includes an image-dividing module that is configured to receive an object image of a device under test (DUT) from an automated-optical-inspection (AOI) apparatus, and divide the object image into the check-point images corresponding to a plurality of check points on the DUT.

In some embodiments, the image-dividing module sets a search range on the object image, and sets one or more labeling ranges within the search range, and set relative positions of different check points within each labeling range. The image-dividing module searches the one or more labeling ranges within the search range, and divide the object image into the check-point image corresponding to each check point according to the relative position of each check point within the corresponding labeling range.

In some other embodiments, the check-point images are from an AOI apparatus, and the check-point images correspond to a plurality of check points of a DUT captured by the AOI apparatus.

In some embodiments, each group labeled by the image-labeling module corresponding to a plurality of defective statuses and a pass status of a plurality of check points on a DUT.

In some embodiments, the image-classification module classifies the check-point images in each group into the types to generate the first structured data according to similarities of the check-point images in each group.

In some embodiments, in response to the similarity between each check-point image in each group and one or more reference images in a specific type being higher than a similarity threshold, the image-classification module classifies the check-point images in each group having greater similarities than the similarity threshold into the specific type.

In some embodiments, the image-classification module sorts the similarity of each check-point image in each group corresponding to at least one of the types, and displays the sorting result on a user interface. After the image-classification module has labeled the one or more check-point images in each group, the image-classification module moves the labeled one or more check-point images to corresponding sub-directories to be classified.

In some embodiments, each type in each group of the first structured data records corresponding serial numbers of the check-point images, which is output as a classification file by the image-classification module.

In some embodiments, the image-generating module sets the variation range of each of one or more image parameters, and the image-generating module randomly generates each image parameter from the variation range of each image parameter to perform image processing on the check-point images to generate a plurality of simulated check-point images. The one or more image parameters comprise brightness, contrast, and gamma of red pixels, green pixels, and blue pixels of the original check-point images, a rotation angle, pixel offsets along the X-axis and Y-axis, sharpness, blurriness, and a scaling ratio.

In some embodiments, the image-generating module calculates a first simulated check-point image using an original check-point image and a set of specific image parameters, and displays the first simulated check-point image on the user interface.

In some embodiments, there is a first number of check-point images and simulated check-point images in each group of the second structure data is generated by the image-generating module, and a second number of check-point images and simulated check-point images in each type of each group is obtained by dividing the first number by a number of types in each group.

In another exemplary embodiment, an image-recognition method is provided. The method includes the following steps: receiving a plurality of check-point images, and classifying the check-point images into a plurality of groups; classifying the check-point images in each group into a plurality of types to generate first structured data, wherein the first structured data comprises a first layer and a second layer, and the first layer indicates the groups in different statuses, the second layer is located with directories of the first layer, and the types in each group of the second layer indicate different components in a status corresponding to each group; and balancing a number of the check-point images in each type of each group in the first structured data to generate second structured data, wherein the second structured data is used to train an AI model for image recognition.

In yet another exemplary embodiment, an image-recognition apparatus is provided. The image-recognition apparatus includes: a non-volatile memory, configured to store an artificial-intelligence (AI) image-recognition program; and a processor, configured to perform the AI image-recognition program to perform the following steps: receiving a plurality of check-point images, and classifying the check-point images into a plurality of groups; classifying the check-point images in each group into a plurality of types to generate first structured data, wherein the first structured data comprises a first layer and a second layer, and the first layer indicates the groups in different statuses, the second layer is located with directories of the first layer, and the types in each group of the second layer indicate different components in a status corresponding to each group; and balancing a number of the check-point images in each type of each group in the first structured data to generate second structured data, wherein the second structured data is used to train an AI model for image recognition.

BRIEF DESCRIPTION OF THE DRAWINGS

The present disclosure can be more fully understood by reading the subsequent detailed description and examples with references made to the accompanying drawings, wherein.

DETAILED DESCRIPTION OF THE DISCLOSURE

The following description is made for the purpose of illustrating the general principles of the disclosure and should not be taken in a limiting sense. The scope of the disclosure is best determined by reference to the appended claims.

It should be understood that the words "comprising", "including" and the like used in this specification are used to indicate the existence of specific technical characteristics, numerical values, method steps, work processes, components and/or components, but not It does not exclude that you can add more technical features, values, method steps, job processing, components, components, or any combination of the above.

The terms such as "first", "second", and "third" are used in the claims to modify the elements in the claims, and are not used to indicate that there is a priority order, prior relationship, or is a component before another component, or the time sequence when performing method steps, only used to distinguish components with the same name.

Figure 1:
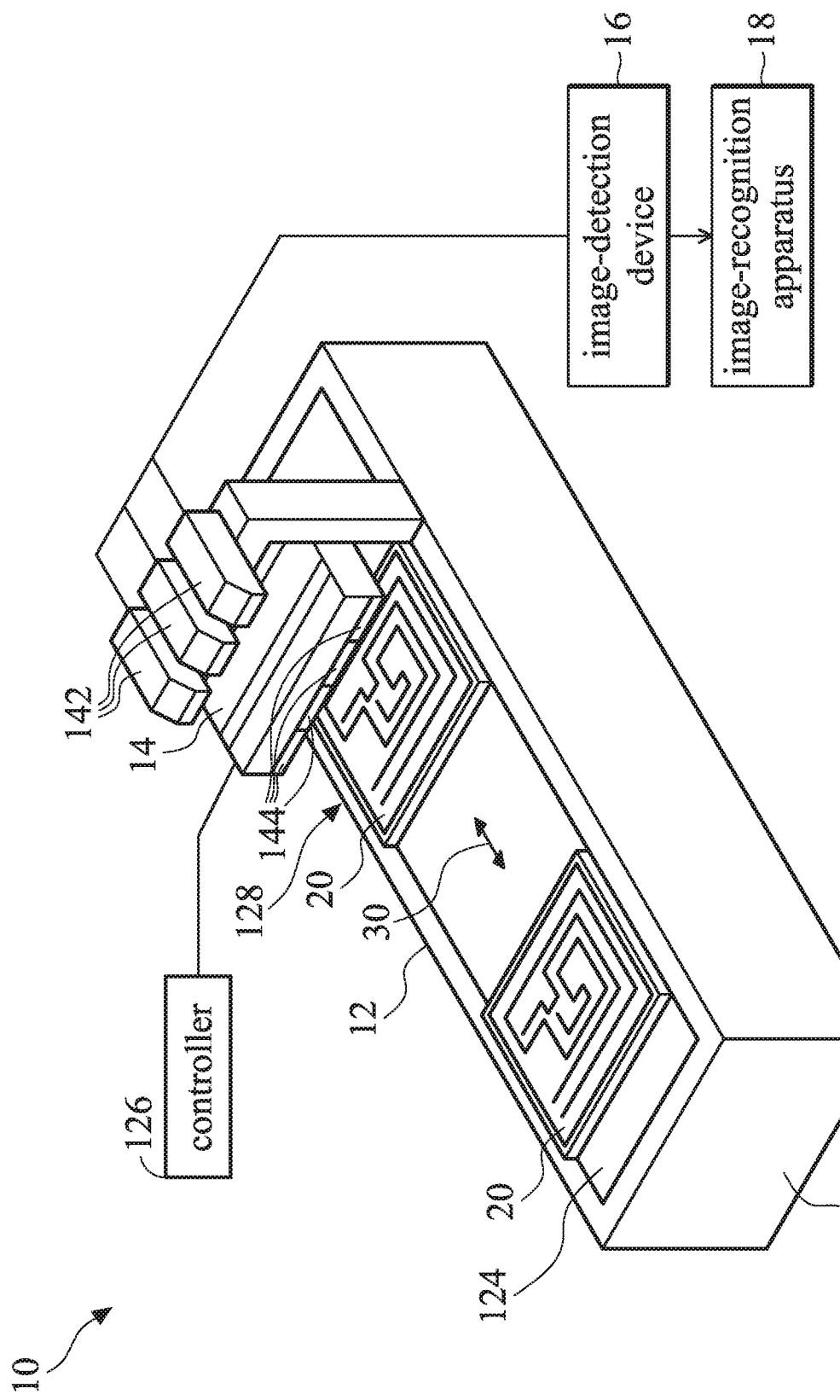
FIG. 1 is a diagram of an automated-optical-inspection system in accordance with an embodiment of the disclosure.

FIG. 1 is a diagram of an automated-optical-inspection system in accordance with an embodiment of the disclosure.

As depicted in FIG. 1, the AOI system 10 includes an automatic conveying device 12, an AOI device 14, an image-inspection device 16, and an image-recognition apparatus 18. The automatic conveying device 12 includes, for example, a casing 122 and a driving mechanism 124. The driving mechanism 124 is disposed above the casing 122 to sequentially deliver one or more devices under test (DUTs) 20 a detection-positioning point 128 on the casing 122, so that the AOI device can take a picture of the DUT 20 or perform an optical-inspection procedure to obtain one or more object images. The driving mechanism 124 can be realized by, for example, a conveyor belt or a robot arm, and the direction of the driving mechanism 124 to transport the DUT 20 (as indicated by arrow 30) is controlled by the controller 126. For example, the controller 126 may be implemented by a microcontroller, a programmable logic controller (PLC), or a personal computer, but the disclosure is not limited thereto.

The AOI device 14 includes one or more image sensors 142 and one or more illumination devices 144, wherein the illumination device 144 is used to provide light to the DUT 20 on the detection-positioning point 128. The image sensor 142 is used to take a picture of the DUT 128 on the detection-positioning point 128 to obtain the object image. The illumination device 144 can be implemented by, for example, a light-emitting diode (LED) or different types of light sources, and the image sensor 142 can be implemented by a charge-coupled device (CCD) sensor or a complementary-metal-oxide-semiconductor (CMOS) sensor, but the disclosure is not limited thereto. In addition, the overall field of view (FOV) of the image sensors 142 in the AOI device 14 may cover the DUT 20 on the detection-positioning point 128.

The image-detection device 16 may be implemented, for example, by a personal computer or a server. In an embodiment, the image-detection device 16 is configured to obtain the object image of the DUT 20 from the image sensor 142, perform image pre-processing on the object image, and perform optical image recognition on the processed object image, thereby determining whether one or more check points in the DUT are defective.

For example, the aforementioned image pre-processing may include but not limited to noise cancellation, enhancing image contrast, enhancing image edges, capturing image features, image scaling and rotation, image alignment and calibration, image transformation, etc. The image-detection device 16 may use relevant image pre-processing techniques on the object image, and it is easier to perform subsequent image analysis and image recognition on the processed object image. In some embodiments, the image-detection device 16 can be omitted, and the aforementioned image pre-processing may be performed by the image-recognition apparatus 18. In some other embodiments, the image-detection device 16 can be integrated into the image-recognition apparatus 18.

In the first embodiment, the image-detection device 16 is configured to obtain the object image of the DUT 20 from the image sensor 142, and perform image pre-processing on the object image. Then, the image-detection device 16 transmits the processed object image to the image-recognition apparatus 18 for subsequent image processing.

In the second embodiment, the image-detection device 16 may perform machine-vision software to divide the processed object image into one or more check-point images, and perform image recognition on each check-point image, wherein the machine-vision software may preset image-recognition conditions corresponding to each check-point image of the object image of the DUT 20, thereby recognizing the defective status of each check point. Taking a printed circuit board (PCB) as an example, the defective status of each check point may include: missing component, skew, tombstone, wrong component, foreign component, flipped component, wrong polarity, lifted lead, lead defective, solder bridge, insufficient solder, short circuit, false welding (air welding), cold welding, etc., but the disclosure is not limited thereto. After setting image-recognition condition corresponding to DUTs of different types, the image-detection device 16 may transmit the check-point images in which the defective status is recognized to the image-recognition apparatus 18 for subsequent processing. In some embodiments, the image-recognition apparatus may also obtain the check-point images or object images from a cloud database (not shown in FIG. 1), but the disclosure is not limited thereto. For convenience of description, the DUT 20 in the following embodiments is described using a PCB as an example.

Figure 2:
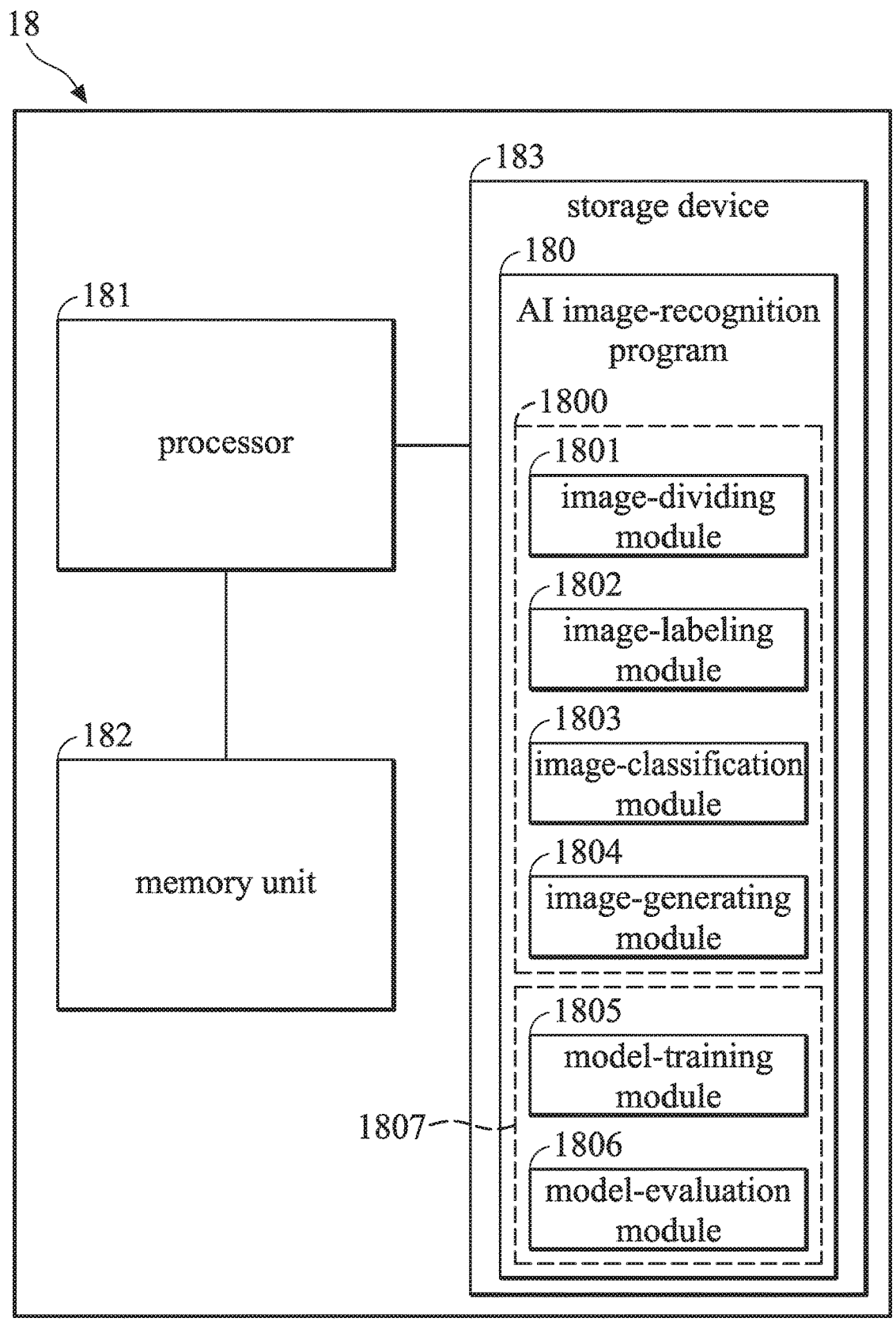
FIG. 2 is a block diagram of an image-recognition apparatus in accordance with an embodiment of the disclosure.

FIG. 2 is a block diagram of an image-recognition apparatus in accordance with an embodiment of the disclosure.

The image-recognition apparatus 18 can be implemented by one or more personal computers, servers, or other types of computing apparatuses. The image-recognition apparatus 18 may include a processor 181, a memory unit 182, and a storage device 183. The processor 181, for example, may be implemented by a central processing circuit (CPU) or a general-purpose processor, but the disclosure is not limited thereto. The memory unit 182 is a volatile memory such as a static random access memory (SRAM) or a dynamic random access memory (DRAM).

The storage device 183 may be a non-volatile memory such as a hard-disk drive (HDD), a solid-state disk, a flash memory, a read-only memory, an erasable programmable read-only memory (EPROM), an electrically erasable programmable read-only memory (EEPROM), or an e-fuse, but the disclosure is not limited thereto.

The storage device 183 stores an artificial-intelligence (AI) image-recognition program 180 that is configured to perform corresponding processing on the processed object image from the image-detection device 16, or on the check-point images that are recognized as having a defective status. For example, the AI image-recognition program 180 may include a data-preparation program 1800 and a model-generating program 1807, wherein the data-preparation program 1800 may include an image-dividing module 1801, an image-labeling module 1802, an image-classification module 1803, and an image-generating module 1804, and the model-generating program 1807 may include a model-training module 1805 and a model-evaluation module 1806. The processor 181 may load the AI image-recognition program 180 from the storage device 183 to the memory unit 182 for execution, thereby controlling and coordinating functions corresponding to modules 1801 to 1806.

The image-dividing module 1801 may be configured to cut the AOI object image from the image-detection device 16 to obtain the check-point image corresponding to each check point on the DUT 20. It should be noted that, in the second embodiment, since the image-detection device 16 transmits the check-point image recognized as the passing status or defective state to the image-recognition apparatus 18, it is not necessary for the image-dividing module 1801 to process the aforementioned check-point images. Accordingly, the image-dividing module is suitable for the case of the first embodiment.

Figure 4A:
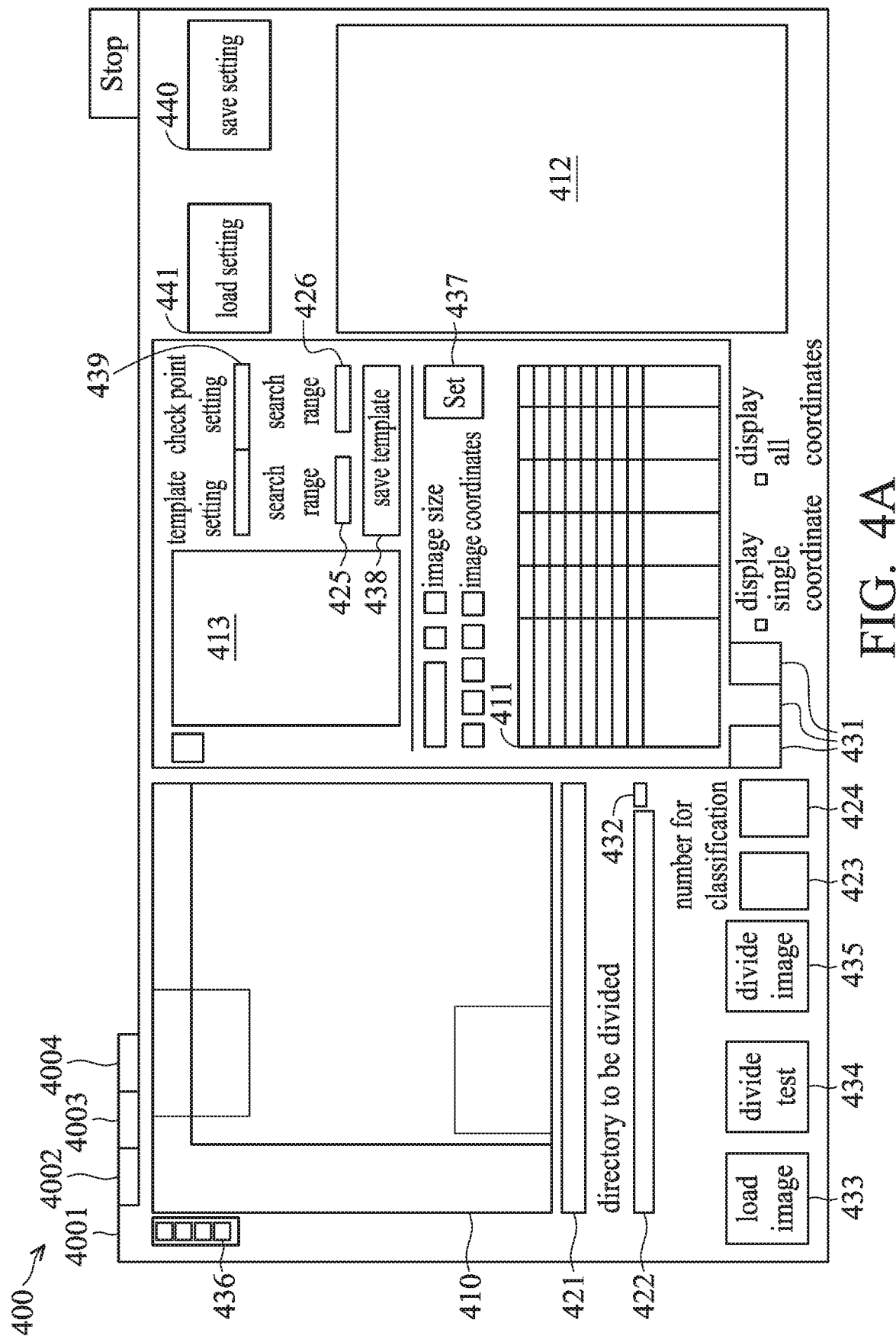
FIG. 4A is a diagram of the user interface of the image-dividing module of the data-preparation program in accordance with an embodiment of the disclosure.
Figure 5:
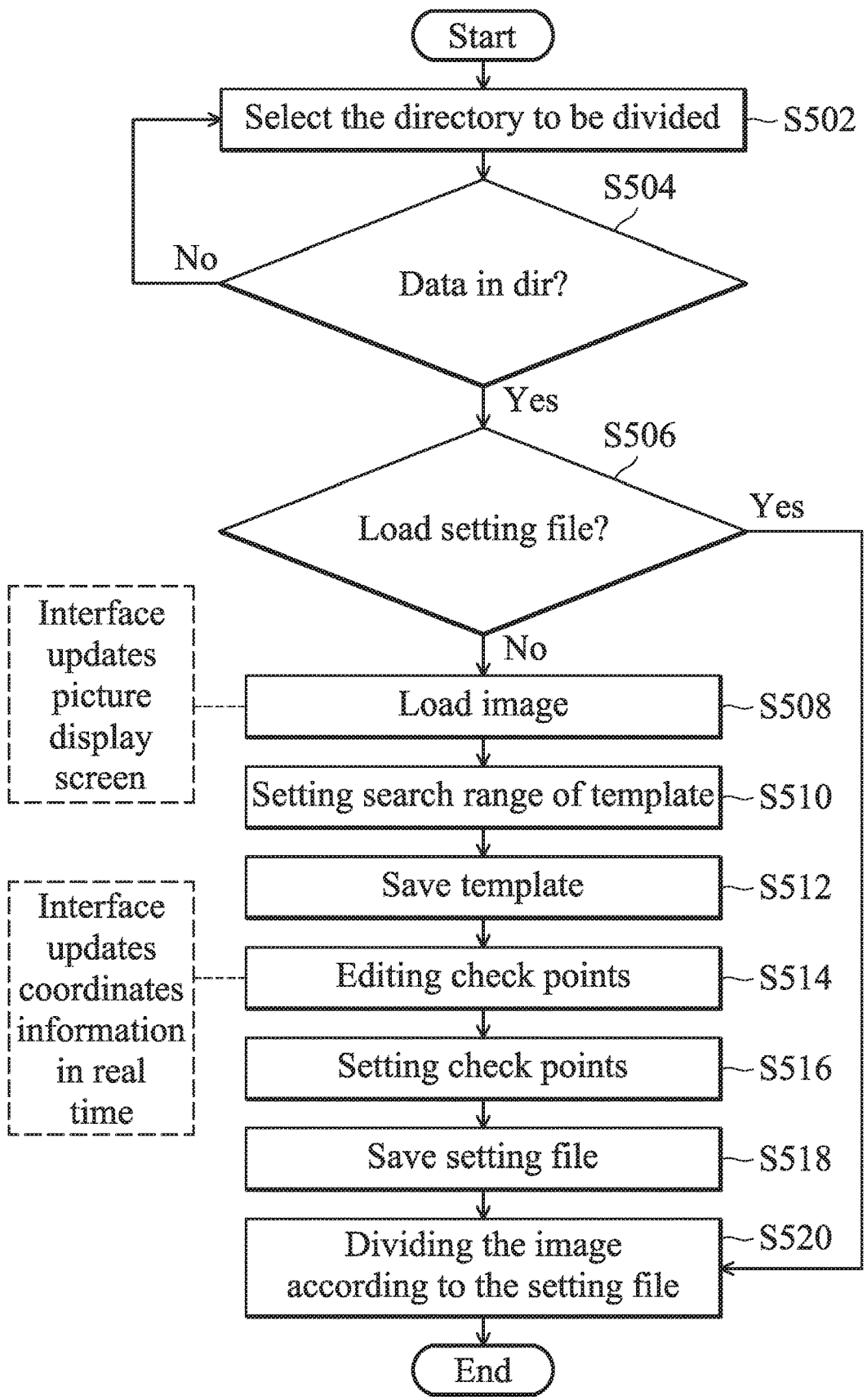
FIG. 5 is a flow chart of the operation procedure of the image-dividing module in accordance with an embodiment of the disclosure.

FIG. 4A is a diagram of the user interface of the image-dividing module of the data-preparation program in accordance with an embodiment of the disclosure. FIG. 5 is a flow chart of the operation procedure of the image-dividing module in accordance with an embodiment of the disclosure.

Referring to FIG. 2, FIG. 4A, and FIG. 5, in an embodiment, the user may select one of buttons 4001 to 4004 on the user interface 400 of the data-preparation program 1800 to switch to the user interface of the image-dividing module 1801, image-labeling module 1802, image-classification module 1803, or image-generating module 1804. After the user has selected button 4001, the user interface 400 is switched to the user interface of the image-dividing module 1801, as shown in FIG. 4A. After the AOI device 14 or image-detection device 16 has transmitted the AOI object image to the image-recognition apparatus 18, the image-recognition apparatus 18 stores the AOI object image to a designated directory.

Before the image-dividing module 1801 starts to operate, it needs to first select the directory to be divided (step S502), which means that it is necessary to first select the directory where the AOI object image to be divided is located. For example, button 432 on the user interface 400 can be pressed to select the directory to be divided, and the path of the directory to be divided is shown in field 422. The image-dividing module 1801 may determine whether there is data (e.g., AOI object image) in the directory to be divided (step S504). If there is data in the directory to be divided, step S506 is performed (e.g., button 441 is pressed) to determine whether to load a previously stored setting file. If there is no data in the directory to be divided, the flow goes back to step S502. In some embodiments, the order of steps S502 and S504 can be placed after step S518.

If the previously stored setting file is loaded in step S506, the flow proceeds to step S520. If the previously stored setting file is not loaded in step S506, step S508 is performed to load the image (e.g., the AOI object image) in the directory to be divided. For example, the aforementioned setting file may include settings of a template and check points to be used in the image-dividing process on the AOI object image. If there are one or more AOI object images in the directory to be divided, the image-dividing module 1801 may automatically display the previous image of the first AOI object image in block 410 of the user interface 400, and the image information of the displayed AOI object image is shown in field 421. In some embodiments, the user may press button 433 to select the AOI object image in the directory to be divided, and the selected AOI object image is shown in block 410, and the user may also adjust the size of the displayed AOI object image and drag the displayed AOI object image to the area to be viewed. The updated display screen is displayed in block 410 in real time, and the aforementioned operation corresponds to the operation "interface updates picture display screen" and step S508 in FIG. 5. In some other embodiments, the user may not select the directory to be divided, but select one of the images in the image set to be divided (i.e., the AOI object image) as a template to complete the settings related to image dividing.

In step S510, a search range of the template is set. For example, the user may set a frame range of the template, such as switching toolbar 439 to the position of "template setting" and pressing button 436 to set the search range of the template. The user may select a frame-selection tool to mark the search range of the template, and the image-dividing module 1801 will record the coordinate information of the search range of the template accordingly and store it in the template setting. The horizontal (X) and vertical (Y) dimensions of the search range are respectively displayed in fields 425 and 426. After the template is set, the user may press button 438 to store the template setting (step S512).

In step S514, the check points are edited, and the check points are set in step S516. For example, the user may switch toolbar 439 to the position of "check-point setting", and then press button 436 to set frame ranges of one or more check points. Whenever the range of the selected frame is determined, button 437 can be pressed to set the range of the corresponding frame, and the mark range of each set frame and its coordinate information will be updated and displayed in block 411 in real time, so that image-dividing module 1801 may divide the check-point images from the AOI object image later using the mark range of each set frame and its coordinate information. In addition, in an embodiment, the frame coordinates of each check point can be saved in the form of relative coordinates. The image-dividing module 1801 may generate a setting file in which the frame-range coordinates of the template and the frame coordinates of the check points are related to each other. The image-dividing module 1801 may record multiple combinations of search-range coordinates and frame coordinates of check points in one template, and each combination can be switched using button 431.

Because there may be pixel shifts between images of different AOI object images from the image-detection device 16, the image-dividing module 1802 needs to set a larger search range outside each labeling range, and the relative positions of different check points can be set within each labeling range. In addition, the labeling range can be regarded as a positioning point or positioning range. When the AOI object images of the same DUT 20 are input into the image-dividing module 1801, the default search range of the template currently being used can be used to find the positioning points (i.e., labeling range), and the AOI object image can be divided into a plurality of check-point images corresponding to the check points according to the relative positions of each check point within the labeling range, wherein the filename of each check-point image may include a name, time, position, number, etc. of the DUT 20.

In step S518, the setting file is saved. When the setting operations of the check points are completed, button 440 can be pressed to save the setting file of the template and check points. In step S520, the image is divided using the setting file. For example, the user may press button 435 to allow the image-dividing module 1801 to perform an image-dividing process on the AOI object image in the directory to be divided using the setting file obtained from the aforementioned flow or by loading previously stored setting file.

Figure 4B:
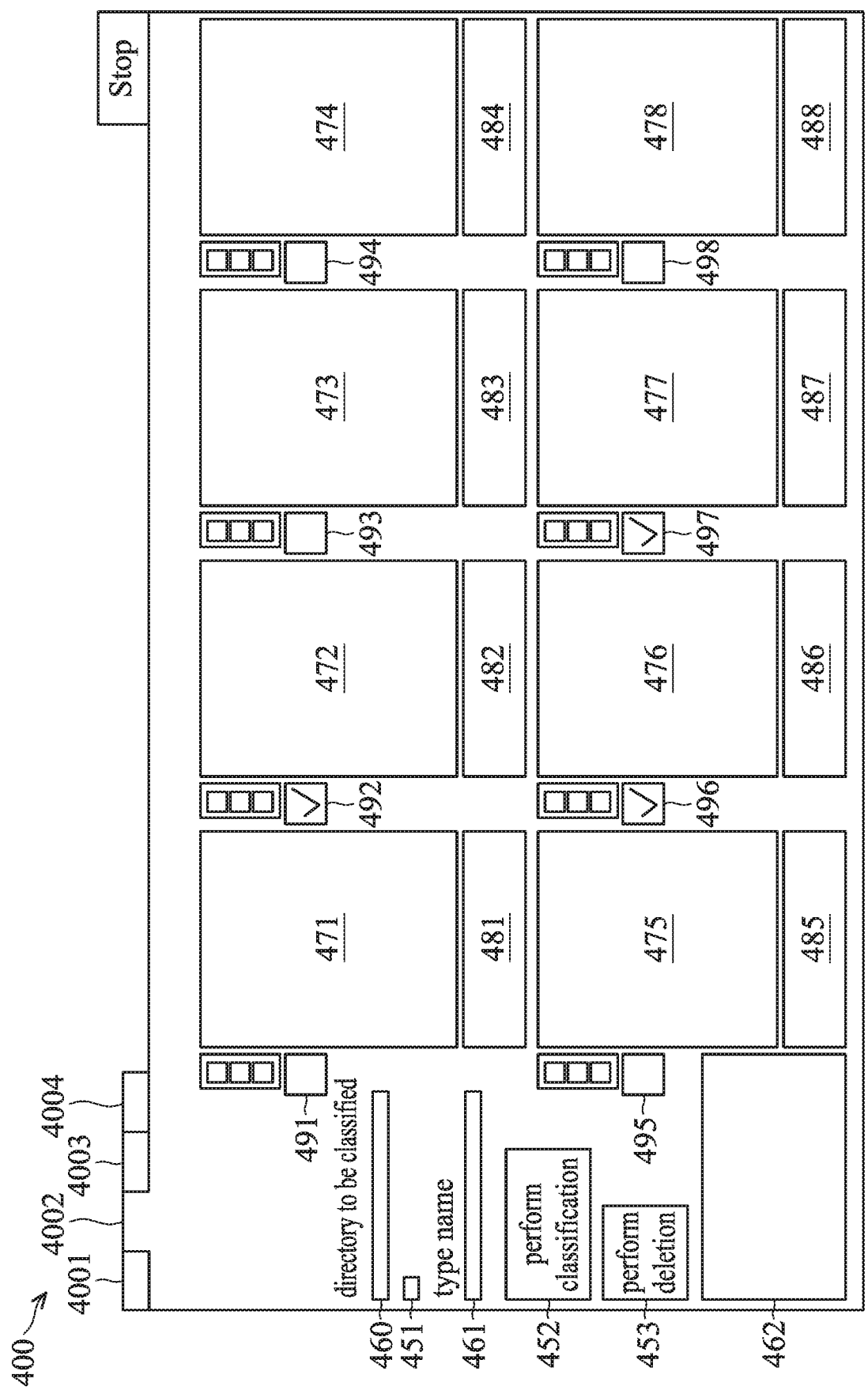
FIG. 4B is a diagram of the user interface of the image-labeling module of the preparation program in accordance with an embodiment of the disclosure.
Figure 6:
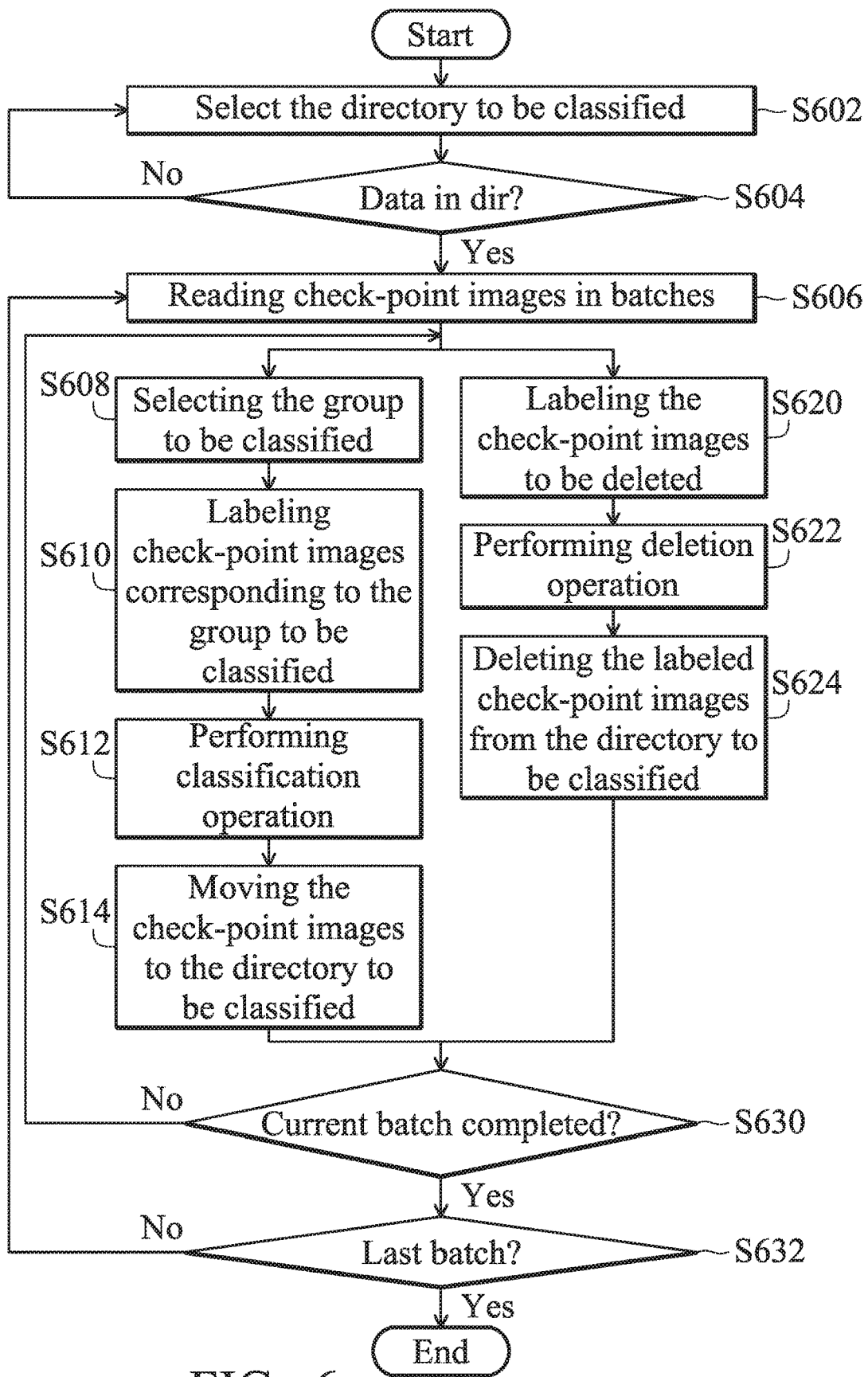
FIG. 6 is a flow chart of the operation procedure of the image-labeling module in accordance with an embodiment of the disclosure.

FIG. 4B is a diagram of the user interface of the image-labeling module of the preparation program in accordance with an embodiment of the disclosure. FIG. 6 is a flow chart of the operation procedure of the image-labeling module in accordance with an embodiment of the disclosure.

Referring to FIG. 2, FIG. 4B, and FIG. 6, the image-labeling module 1802 is configured to obtain the check-point image corresponding to each check point, wherein the check-point is not labeled or classified yet. After the user has pressed button 4002, the user interface 400 is switched to the user interface of the image-labeling module 1802, as shown in FIG. 4B. In step S602, a directory to be classified is selected. For example, the user may press button 451 of the user interface 400 to select the directory to be classified, and the path of the selected directory is shown in field 460. The check-point images in the directory to be classified are check-point images that have not been labeled or classified yet. The user may first build sub-directories of groups to be classified in the directory to be classified, and the labels may include a pass status (e.g., PASS or OK) and defective statuses (e.g., NG1, NG2, NG3, . . . , NGN, etc.), but the disclosure is not limited thereto.

In step S604, it is determined whether there is data in the directory to be classified. If there is data in the directory to be classified (e.g., the number of check-point images to be classified is greater than 0), step S606 is performed. If there is no data in the directory to be classified (e.g., the number of check-point images to be classified is equal to 0), the flow goes back to step S602.

In Step S606, the check-point images are read in batches. For example, in the user interface 400 in FIG. 4B, the image-labeling module 1802 may read 8 check-point images in a batch from the directory to be classified, but the number of check-point images in a batch in the disclosure is not limited to this. After step S606, there are two branch processes, in which steps S608 to S614 belong to the image-classification procedure, and steps S620 to S624 belong to the image-deletion procedure, and one branch can be selected for image classification or image deletion for the current batch of check-point images.

In step S608, a group to be classified is selected. For example, the user may select one of the group names created in advance in field 461 to classify the 8 check-point images in the current batch. In step S610, the check-point images of the group to be classified are labeled. For example, the 8 check-point images in the current back are respectively displayed in blocks 471 to 478, and their corresponding image information is respectively shown in fields 481 to 488. In addition, the 8 check-point images in the current batch have corresponding fields 491 to 498. The operator may label each check-point image in the current batch by checking fields 491 to 498 of the user interface 400. In the embodiment, fields 492, 496, and 497 are checked, and the group name to be classified is "OK", as shown in FIG. 4B.

In step S612, a classification operation is performed, and step S614, the labeled check-point images are transferred to the group directory to be classified. For example, when the user presses button 452 to perform the classification operation, the image-labeling module 1802 may move the check-point images in blocks 472, 476, and 477 to the group directory to be classified, such as the "OK" group has been selected for classification in FIG. 4B. In some embodiments, if there are still check-point images to be classified (or to be deleted) in the directory to be classified, the image-labeling module 1802 may successively display the check-point images to be classified (or to be deleted) in blocks 471 to 478.

Steps S620 to S624 belong to the image-deletion procedure. In step S620, the check-point images to be deleted are labeled. In an embodiment, although the preset different groups have been included in the directory to be classified, when the image-labeling module 1802 classifies the check-point images, there may still be some check-point images that do not belong to any preset group, so there is need to delete these check-point images from the directory to be classified. In another embodiment, the image-labeling module 1802 may select a directory that has been grouped when selecting a directory to be classified, and check whether there is any check-point image that does not belong to this directory. If there is a check-point image that does not belong to the directory that has been grouped, the check-point image can be deleted through steps S620 to S624. In yet another embodiment, the image-labeling module 1802 can select the directories that have been grouped and treat them as directories to be reclassified. Accordingly, the image-labeling module 1802 may move the check-point images in the directory that has been grouped and delete this directory through the image-deletion procedure.

In step S622, a deletion operation is performed, and in step S624, the labeled check-point images are deleted from the directory to be classified. For example, when the user presses button 453 to perform the deletion operation, the image-labeling module 1802 may delete the check-point images labeled in blocks 472, 476, and 477 from the directory to be classified. In some embodiments, if there are still check-point images to be classified (or to be deleted) in the directory to be classified, the image-labeling module 1802 may successively display these check-point images to be classified (or to be deleted) in blocks 471 to 478.

In step S630, it is determined whether the check-point images in the current batch have been processed. If the check-point images in the current batch have all been processed, step S632 is performed. If the check-point images in the current batch have not been processed yet, the flow goes back to step S608 or S620 to perform image classification or image deletion on the remaining check-point images in the current batch.

In step S632, it is determined whether the current batch is the last batch. If the current batch is the last batch, the flow ends. If the current batch is not the last batch, the flow goes back to step S606 to read the check-point images in another batch from the directory to be classified.

In some embodiments, the operator may label each check-point image in each batch, and the image-labeling module 1802 may generate a user interface to display each check-point image in the current batch, and obtains the label corresponding to each check-point image, wherein the aforementioned label may include a "pass" state or defective statuses (e.g., NG1, NG2, NG3, . . . , NGN, etc.). In some other embodiments, the image-labeling module 1802 may include an image-recognition function that is configured to perform image recognition on each check-point image to determine the status of each check-point image, such as the pass state or defective state. Taking a printed circuit board (PCB) as an example, the defective status of each check point may include: missing component, skew, tombstone, wrong component, foreign component, flipped component, wrong polarity, lifted lead, lead defective, solder bridge, insufficient solder, short circuit, false welding (air welding), cold welding, etc., but the disclosure is not limited thereto.

Accordingly, after labeling each check-point image through the image-labeling module 1802, different groups of check-point images can be obtained, for example, each of the pass state and defective states NG1, NG2, NG3, . . . , NGN, etc. can be regarded as different groups, and the image-labeling module 1802 may store the check-point images in different groups into different sub-directories.

Figure 7:
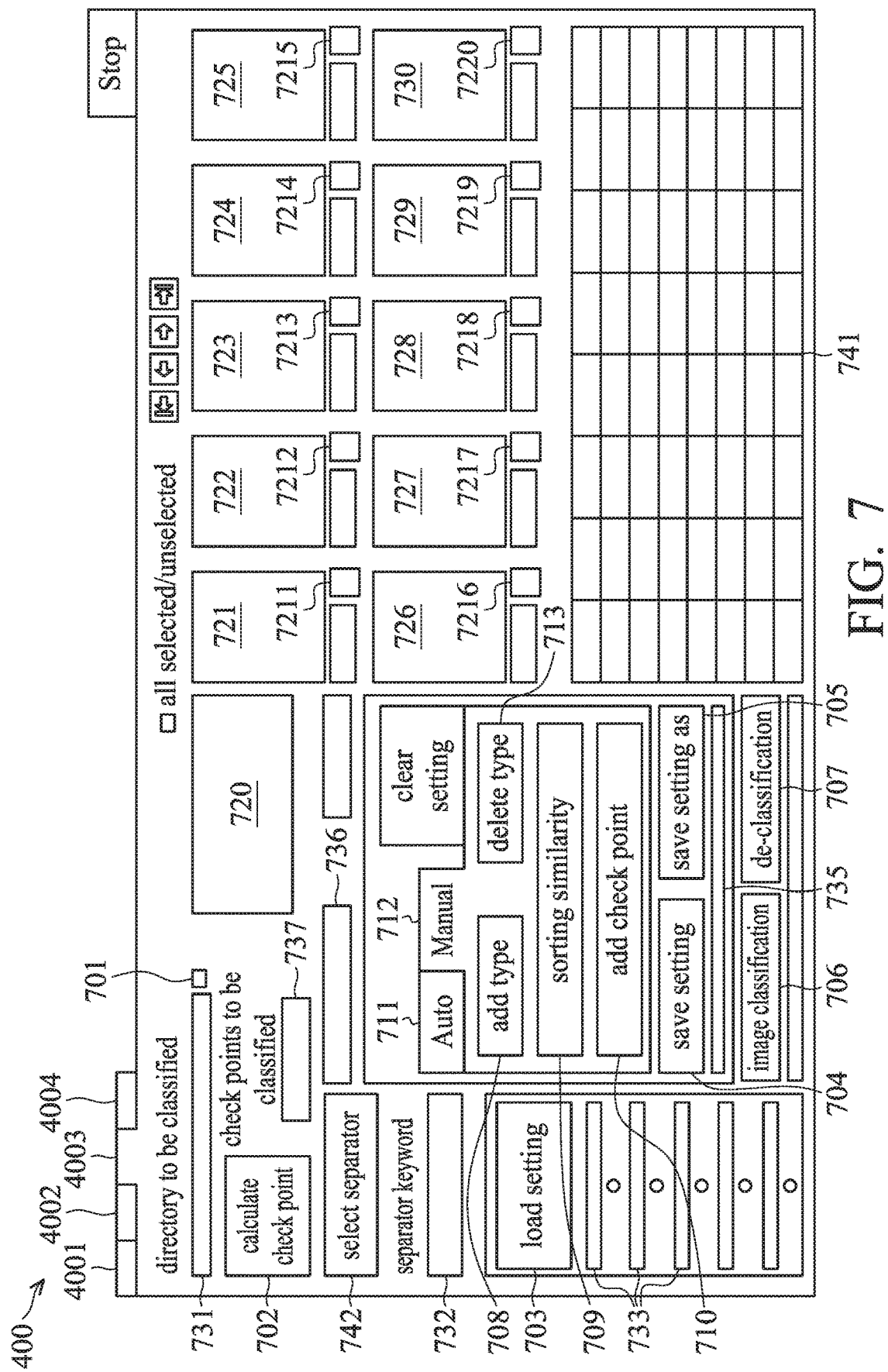
FIG. 7 is a diagram of the user interface of the image-classification module of the data-preparation program in accordance with an embodiment of the disclosure.
Figure 8A:
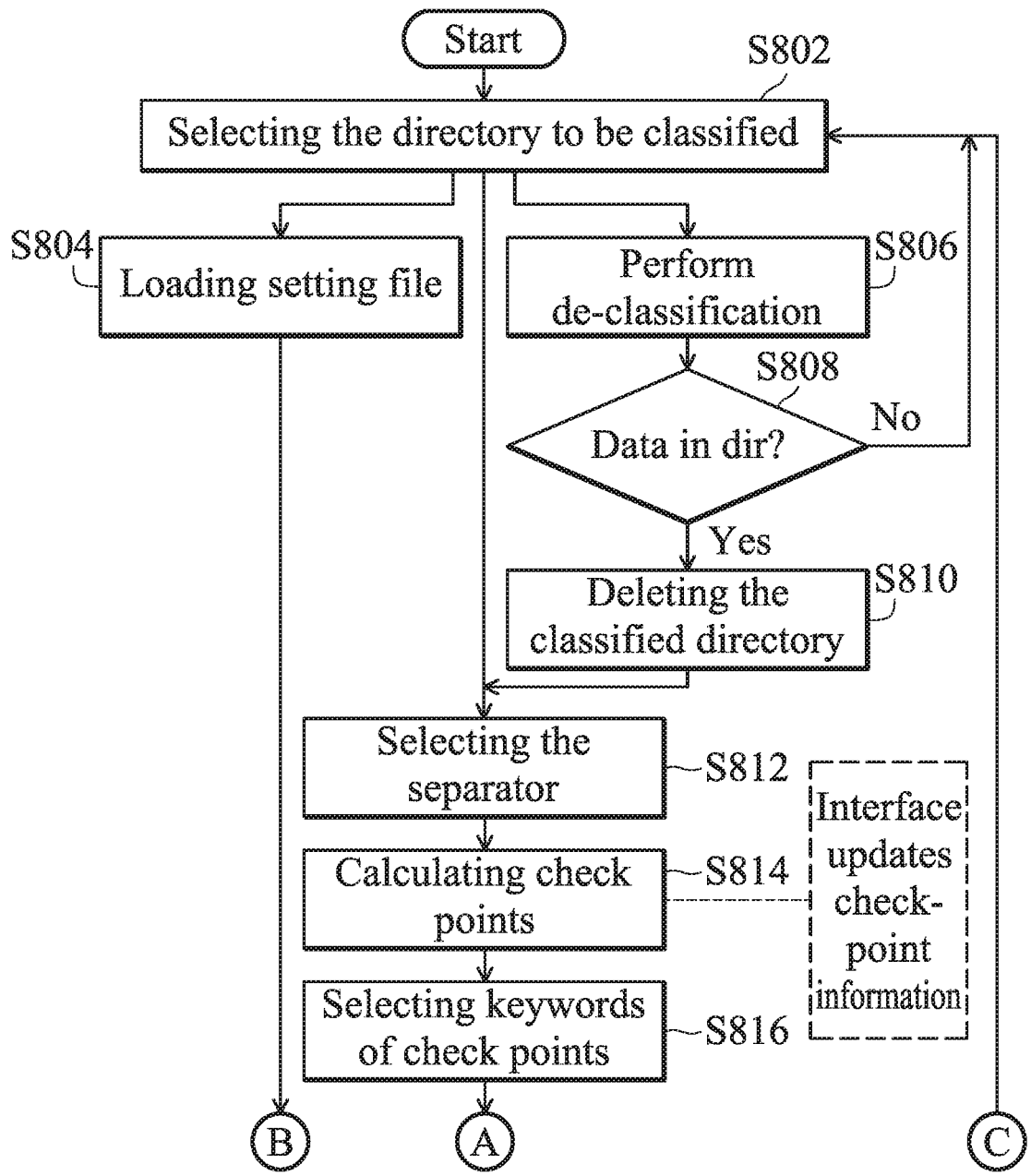
FIGS. 8A and 8B are portions of a flow chart of the operation procedure of the image-classification module in accordance with an embodiment of the disclosure.
Figure 8B:
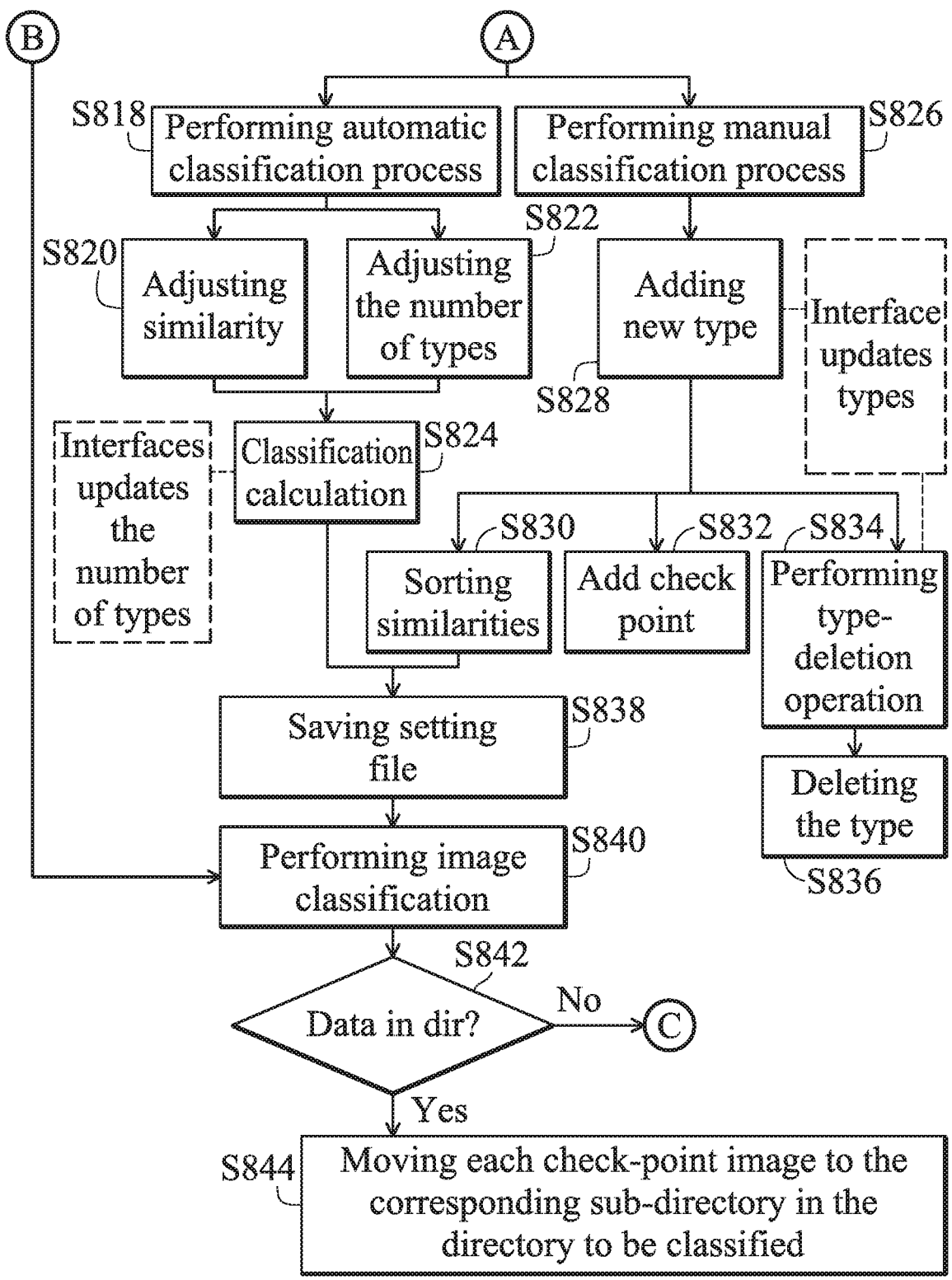

FIG. 7 is a diagram of the user interface of the image-classification module of the data-preparation program in accordance with an embodiment of the disclosure. FIGS. 8A and 8B are portions of a flow chart of the operation procedure of the image-classification module in accordance with an embodiment of the disclosure.

Referring to FIG. 2, FIG. 7, and FIGS. 8A and 8B, when the user selects button 4003 of the user interface 400 in FIG. 4A, the user interface 400 is switched to the user interface of the image-classification module 1803, as shown in FIG. 7. The image-classification module 1803 is configured to allow the operator to perform classification or de-classification on the check-point images in each group labeled by the image-labeling module 1802.

In step S802, a directory to be classified is selected. For example, the user may press button 701 of the user interface 400 to select the directory to be classified, and its path is displayed in field 731. The check-point images in the directory to be classified are check-point images that have been labeled or classified by the image-labeling module 1802, wherein the name of the directory to be classified may correspond to one of the pass status or defective statuses (e.g., NG1, NG2, NG3, . . . , NGN, etc.), but the disclosure is not limited thereto.

In step S804, a setting file is loaded. If there is previously stored setting file of the image-classification module 1803, button 703 can be pressed to select the previously stored setting file, and its path is displayed in field 734. The setting file may include, for example, separator settings, keywords of check points, similarity threshold, and type names.

In step S806, a de-classification operation is performed. For example, the name of the directory to be classified selected in step S802 corresponds to a passing status or defective status, and the check-point images in the directory to be classified have been labeled or classified by the image-labeling module 1802. If it is desired to restore the check-point images in the currently-selected directory to be classified to a status where they have not been labeled or to re-classify the check-point images that have been classified, the de-classification operation needs to be performed. In step S808, it is determined whether there is data in the directory to be classified. If there is data in the directory to be classified, step S810 is performed. In step S810, the currently-selected directory to be classified is deleted. For example, the image-classification module 1803 may move the check-point images in the currently-selected directory to be classified to an upper-level directory (i.e., the directory to be classified selected by the image-labeling module 1802), and then delete the currently-selected directory to be classified.

In step S812, a separator is selected. For example, the file name of each check-point image in the currently-selected directory to be classified has a corresponding number, shooting condition, time, etc., and a specific separator (e.g., a underline, semicolon, or the like) is used in the file name to separate the aforementioned different conditions so as to distinguish these conditions from each other. The user may select the separator to be used in block 742. In step S814, the check points are calculated. For example, the user may press button 702 to allow the image-classification module 1803 to calculate the number of check-point images in the currently-selected directory to be classified, and the calculated number of check-point images is shown in field 737. In step S816, a keyword of the check points is selected. For example, the user may fill the keyword of the check points in field 732, or use the drag-down menu in field 732 to select the check points in the currently-selected directory to be classified.

Step S818 to S824 belong to an automatic classification procedure, and step S826 to S834 belong to a manual classification procedure. The user may press buttons 711 or 712 of the user interface 400 to switch to the automatic classification procedure or manual classification procedure. In step S818, an automatic-classification process is performed. In step S820, a similarity is adjusted. For example, in step S820, the image-classification module 1803 may adjust the similarity threshold as a similarity determination criterion for the check-point images in the directory to be classified. In step S822, the number of types is adjusted. The number of types may indicate the number of type directories generated in the directory to be classified to subsequent use. The user may first estimate the number of types required in the directory to be classified, and then adjust the number of types. It should be noted that the order of steps S820 to S822 can be switched sequentially or can be executed simultaneously.

In step S824, classification calculation is performed. For example, the image classification module 1803 can, for example, classify a plurality of check-point images that have high degree of similarity in content or attributes into the same group. The image-classification module 1803 may set a similarity threshold, and calculate a similarity value between each check-point image in the currently-selected directory to be classified (i.e., group directory) and a reference image in at least one type, and display the check-point images having similarity values higher than the similarity threshold in each group in blocks 721 to 728 of the user interface 400, and display information about the check-point images having similarity values higher than the similarity threshold in each group in block 741. During the automatic classification procedure, the image-classification module 1803 may not display the check-point images whose similarity values are higher than the similarity threshold in each group in the user interface 400, but may move these check-point images in each group to corresponding type directories. Specifically, the user may classify at least one check-point image (e.g., can be regarded as a reference image) in the "pass" group into a specific type. During classifying the check-point images in each group, the image-classification module 1803 may calculate the similarity values between the pre-classified check-point image and each unclassified check-point image in each group, and filter the check-point images having similarity values higher than the similarity threshold. The image-classification module 1803 will display the filtered check-point images on the user interface, and perform the classification process on the filtered check-point images. The unclassified check-point images in other groups can be classified into corresponding types in a similar manner. For example, a resistor may have a higher similarity with another resistor, but a resistor may have a lower similarity with a capacitor. In response to the similarity between each check-point image in each group and a reference image in a specific type in each group being higher than the similarity threshold, the image-classification module 1803 may classify each check-point image having a similarity higher than the similarity threshold in each group to the same type, wherein the number of types set in step S822 is the upper limit of the number of types that can be classified. If the user updates the number of types during the automatic classification procedure, the user interface 400 will simultaneously update the number of types currently in use, and the image-classification module 1803 may re-calculates the classification.

In step S826, a manual classification procedure is performed. In step S828, a type is added. For example, the user may fill in the name of the type to be added in field 735 of the user interface 400 and press button 708 to add the type in the directory to be classified. The user interface 400 can update the information about the newly added type in real time, and the user may press field 736 to select the added type. In step S830, similarity ranking is performed. In step S832, a check point is added. For example, the image-classification module 1803 may calculate the similarity of each check-point image in the directory to be classified (i.e., group directory) with respect to at least one type, and display the check-point images having similarities higher than the similarity threshold in each group in block 721 to 728 of the user interface 400, and display the sorting result of the similarities of the check-point images in each group in block 741. In addition, the user may also press buttons 7211 to 7220 to label the check-point images. The user may press button 710 of the user interface to add the labeled check point to the corresponding type directory, or press a button of "deleting check point" (not shown) to delete the currently selected check point.

In step S834, a type-deletion operation is performed. In step S836, the type is deleted. For example, the new type name added by the user in step S828 may be incorrect or redundant, and the user may select the type name to be deleted in field 736 of the user interface 400 and press button 713 to delete the selected type.

In step S838, a setting file is saved. For example, no matter whether to use the automatic classification procedure or manual classification procedure, the image-classification module 1803 can store the currently set separator settings, keywords of check points, similarity threshold, and type names as a corresponding setting file.

In step S840, image classification is performed. In an embodiment, the operator may label the field (e.g., fields 7211 to 7220) corresponding to each check-point image displayed in a batch (e.g., in blocks 721 to 730), and press button 706 or 710 to perform image classification, so as to classify multiple check-point images with high similarities of content or attributes into the same type. In another embodiment, the image-classification module 1803 may perform image classification according to the similarity threshold and type name set in the aforementioned procedure and similarity between each check-point image and each type. In step S842, it is determined whether there is data in the directory to be classified. If there is data in the directory to be classified, step S844 is performed to move each check-point image to the corresponding sub-directory in the directory to be classified. For example, the image-classification module 1803 may move the check-point images having similarities higher than the similarity threshold to the corresponding sub-directories. If there is no data in the directory to be classified, the flow goes back to step S802 to select the directory to be classified and then perform the aforementioned procedure again.

After performing the aforementioned process, the corresponding type of each check-point image can be obtained. If groups labeled by the image-labeling module 1802 can be divided into four groups such as "PASS", "NG1", "NG2", and "NG3", the image-classification module 1803 may further classify each check-point image in each of the four groups into a plurality of types, such as the similarity values between different components can be used as the classification criterion, and the same or similar components can be classified into the same type. For example, the image-classification module 1803 may classify the check-point images of the resistors, capacitors, and other components in the "PASS" group respectively into Type 1, Type 2, and Type 3. Similarly, the image-classification module 1803 may also classify the check-point images of the resistors, capacitors, and other components in each of the NG1, NG2, and NG3 groups respectively into Type 1, Type 2, and Type 3 in the corresponding group of NG1, NG2, and NG3 groups.

After the aforementioned image-classification operation is completed, the image-classification module 1803 can obtain group-type structured data (e.g., first structured data, and each type in each group may include corresponding numbers of check points. For example, the PASS-Type1 group-type may include check points 1, 3, and 5, and the PASS-Type2 group-type may include check point 2, and the PASS-Type3 group-type may include check points 4 and 6.

Figure 3:
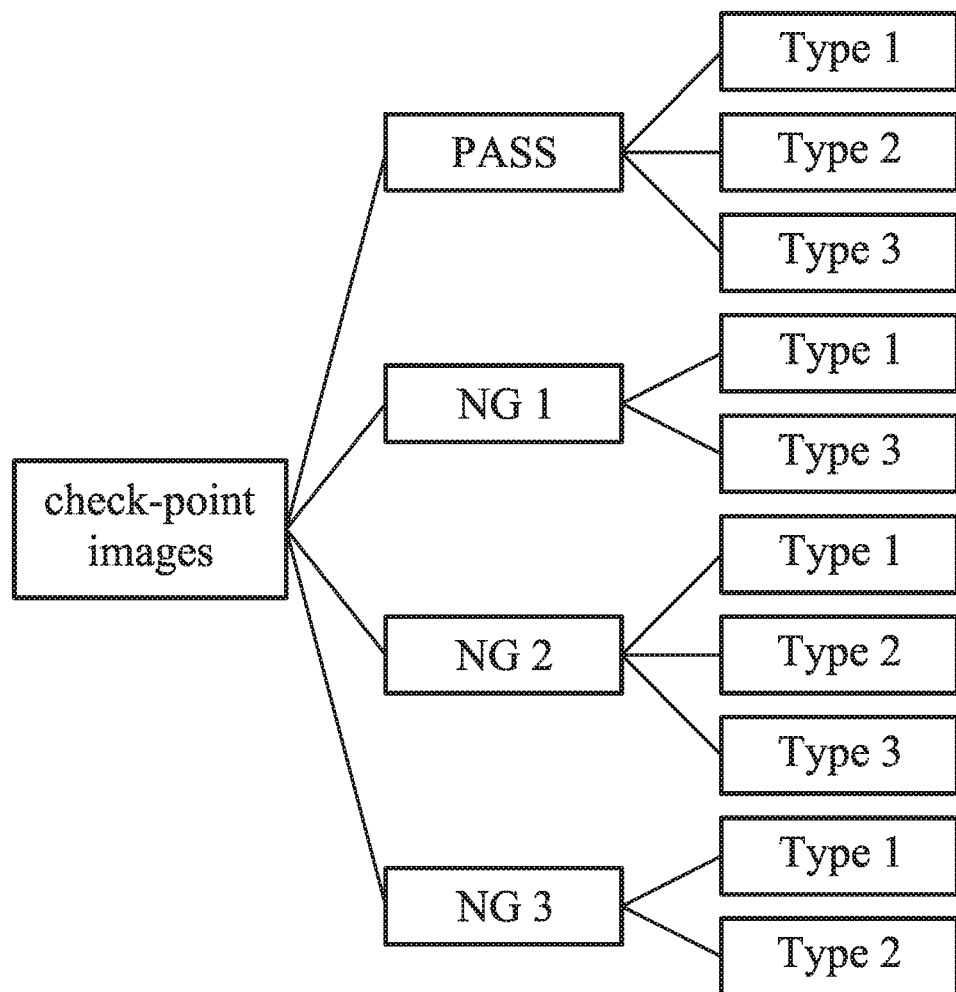
FIG. 3 is a diagram of the first structured data in accordance with an embodiment of the disclosure.

The structured data obtained from the image-classification operation is shown in FIG. 3. The image-classification module 1803 can output the structured data and its corresponding information (e.g., numbers of check-point images) and check-point images as a classification file, and write the classification file in the storage device 183. In the classification file, the name of each group can be set as main directories, and the name of each type in each group can be set as sub-directories, and each sub-directory may include the check-points images and their numbers after image classification. In addition, the classification file generated by the image-classification module 1803 can be used by the image-recognition apparatus 18 for subsequent use. For example, the user may read the previously stored classification file through the user interface of the image-classification module 1803, so the image-classification module 1803 can use the information corresponding to the classification file of the structured data to classify the check-point images generated by the image-dividing module 1801 or the check-point images received from the image-recognition apparatus 16.

It should be noted that, in the aforementioned embodiment, not every defective status may include all types. For example, if group NG1 indicates that the wrong polarity of the components on the PCB, the NG-Type1 group-type may indicate wrong polarity of capacitors. However, the resistors do not have the problem of wrong polarity, and thus group NG1 does not include the type Type2, as shown in FIG. 3.

Figure 9:
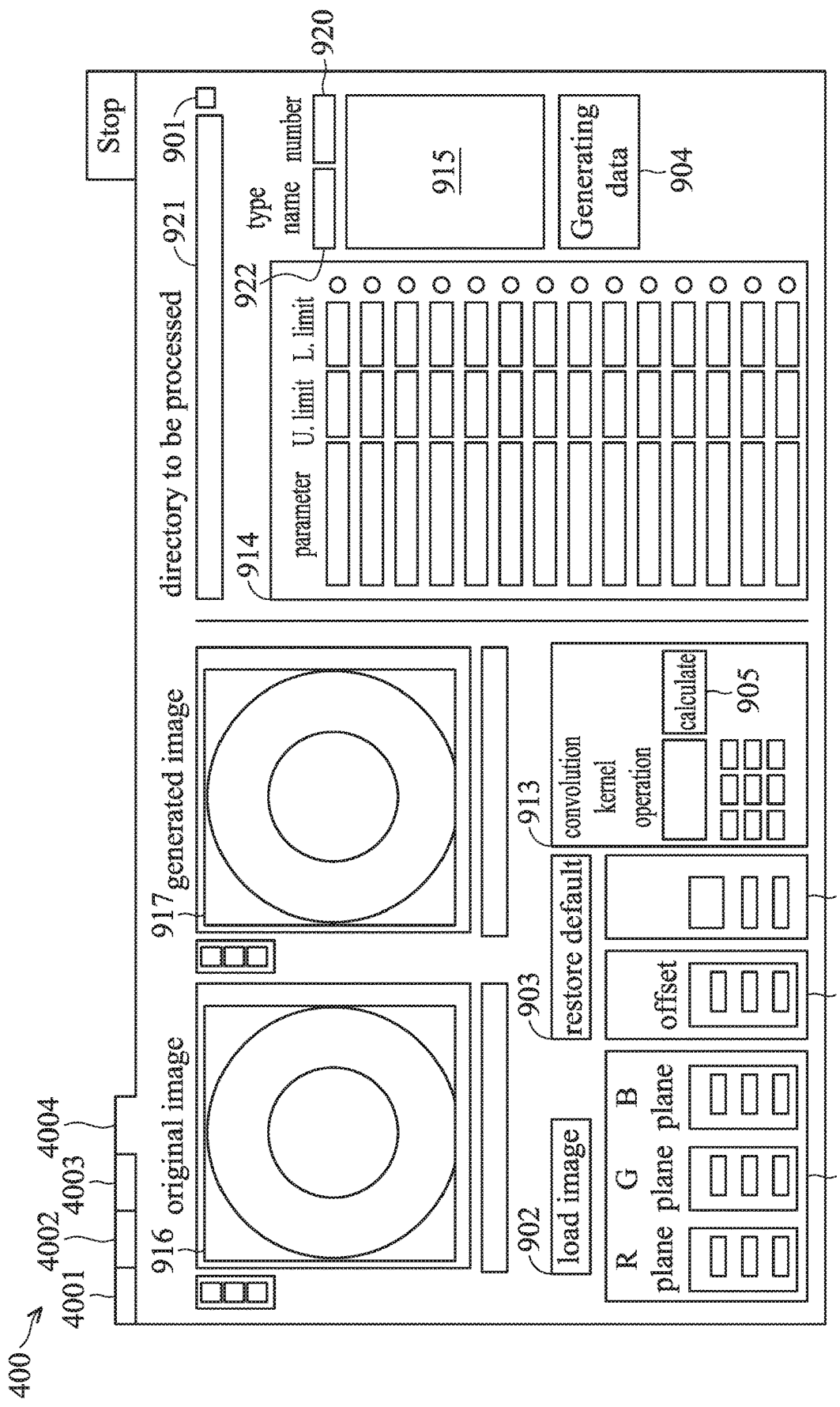
FIG. 9 is a diagram of the user interface of the image-generating module of the data-preparation program in accordance with an embodiment of the disclosure.
Figure 10A:
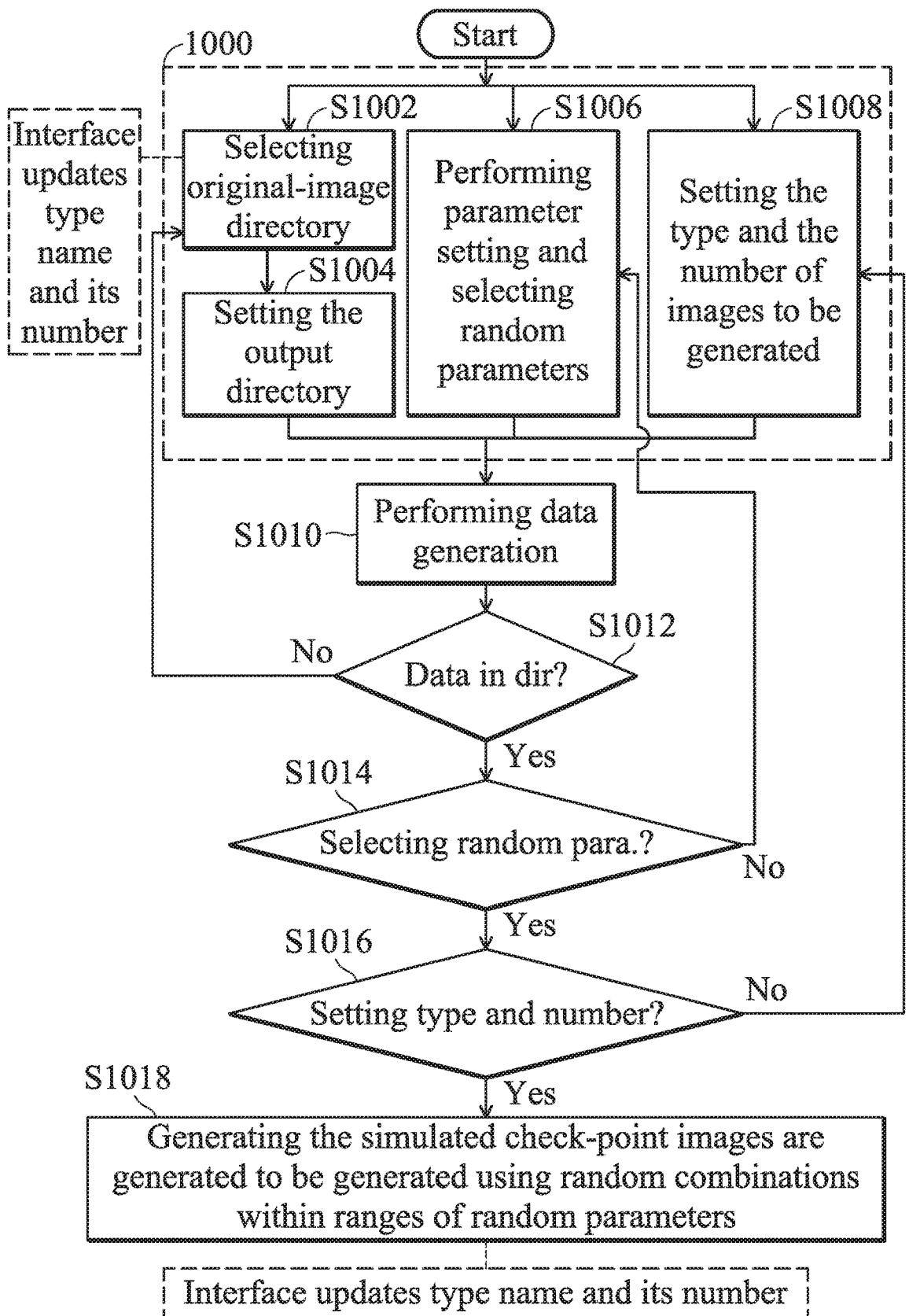
FIGS. 10A and 10B are portions of a flow chart of the operation procedure of the image-generating module in accordance with an embodiment of the disclosure.
Figure 10B:
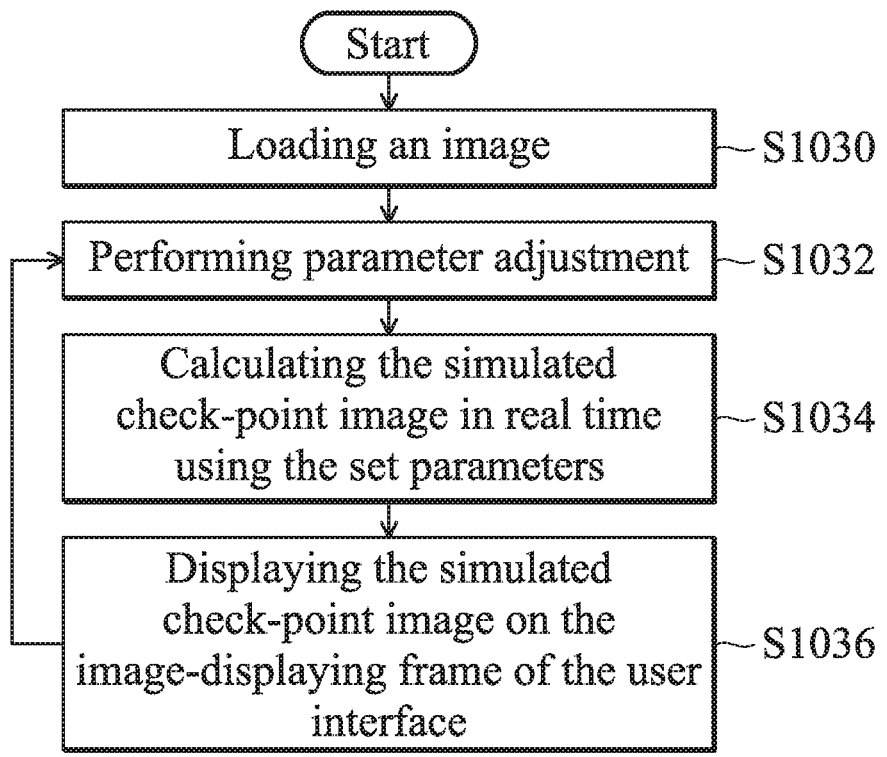

FIG. 9 is a diagram of the user interface of the image-generating module of the data-preparation program in accordance with an embodiment of the disclosure. FIGS. 10A and 10B are portions of a flow chart of the operation procedure of the image-generating module in accordance with an embodiment of the disclosure.

Referring to FIG. 2, FIG. 9, and FIG. 10, after the user select button 4004 of the user interface 400 in FIG. 4A, the user interface 400 is switched to the user interface of the image-generating module 1804, as shown in FIG. 9. The image-generating module 1804 is configured to perform image generation on the one or more group-types generated by the image-classification module 1803 so as to solve the problem of unevenness in the number of samples of the check-point images of some group-types. In step S1002, the original-image directory is selected, and in step S1004, an output directory is set. For example, the user may press button 901 of the user interface 400 to select the original-image directory (i.e., the directory to be processed), and its path is displayed in field 921. For example, the original-image directory may be the root directory of the first structured data, and the root directory may sub-directories of multiple groups. In addition, the original-image directory may also be a group sub-directory of one of the groups in the first structured data, and the group sub-directory may include one or more type sub-directories.

In step S1006, parameter setting and selection of random parameters are performed. Block 914 of the user interface 400 may allow the user to preset ranges of various image parameters for image generation, wherein the image parameters may include but not limited to brightness, contrast and gamma of red, green, blue pixels, rotation angle, pixel offset values along the X-axis and Y axis, sharpness, blurriness, scaling ratio, etc.

The content of image parameters in block 914 is illustrated in Table 1:

TABLE 1

| Image Parameter | Upper Limit | Lower Limit | Selected |
| --- | --- | --- | --- |
| Red plane(Brightness) | 128 | 128 | N |
| Red plane(Contrast) | 45 | 45 | N |
| Red plane(Gamma) | 1 | 1 | N |
| Green plane(Brightness) | 128 | 128 | N |
| Green plane(Contrast) | 45 | 45 | N |
| Green plane(Gamma) | 1 | 1 | N |
| Blue plane(Brightness) | 128 | 128 | N |
| Blue plane(Contrast) | 45 | 45 | N |
| Blue plane(Gamma) | 1 | 1 | N |
| Rotation angle(degrees) | 10 | −10 | Y |
| X offset(pixels) | 10 | −10 | Y |
| Y offset(pixels) | 5 | −5 | Y |
| Blurriness | 0 | 0 | N |
| Scaling ratio(%) | 100 | 100 | N |

In Table 1, the rotation angle, and pixel offsets along the X-axis and Y-axis are set with the upper limit and lower limit of the variation ranges, and these three parameters have been selected as random parameters, and labeled with "Y" to the right of the corresponding fields (e.g., can be expressed by a green-light pattern in the user interface 400), and other parameters that have not been selected are labeled with "N" to indicate that have not been selected. In the aforementioned settings, the range of the rotation angle is set from −10 degrees to +10 degrees, and the range of the pixel offset value along the X-axis is set from −10 pixels to +10 pixels, and the range of the pixel offset value along the Y-axis is set from −10 pixels to +10 pixels. Other unchanged image parameters can use the preset values of the image-generating module 1804, or other unchanged image parameters are not considered temporarily. It should be noted that if the upper limit and lower limit of the parameters are the same, it indicates that the parameter is a fixed value during the image-generation process. For the three selected parameters, the image-generating module 1804 may randomly select values from the variation ranges of the three parameters, and uses the randomly selected values of these three parameters to generate the simulated check-point images.

In step S1008, the types and the number of images to be generated are set. In an embodiment, the user can respectively set the type and the number of images to be generated in blocks 920 and 922 of the user interface 400. Specifically, for the classification results of the group-types of the check-point images of the DUT 20 generated by the aforementioned procedure, the number of check-point images in each group-type is not necessarily even. With regard to the AI model in the model-training module 1805, it requires a huge amount of data and samples during the training phase. If the model-training module 1805 trains the AI model directly using the classification result (i.e., the first structured data) of the group-types generated by the image-classification module 1803, the AI model may have a low recognition rate, or cause misjudgment or insufficient confidence level. It should be noted that block 1000 indicates a setting phase of image generation, and steps S1002 to S1008 in block 1000 can be executed in any order.

In step S1010, a data-generation operation is performed. For example, the user may press button 904 to perform data generation. In step S1012, it is determined whether there is data in the original-image directory. If there is data in the original-image directory, step S1014 is performed. If there is no data in the original-image directory, the flow goes back to step S1002.

In step S1014, it is determined whether random parameters have been selected. If random parameters have been selected, step S1016 is performed. If random parameters have not been selected yet, the flow goes back to step S1006. In step S1016, it is determined whether the type and number of images to be generated have been set. If the type and number of images to be generated have been set, step S1018 is performed. If the type and number of images to be generated have not been set yet, the flow goes back go step S1008. For example, before performing the image-generation process, the image-generating module 1804 has to determine whether each parameter in the setting phase (block 1000) has been set or selected. If some specific parameters have not been set or selected, the flow has to go back to the corresponding step in the setting phase to set these specific parameters.

In step S1018, the simulated check-point images are generated in the directory to be generated using random combinations within ranges of random parameters. For example, parameters have been set and selected in step S1006, and the random parameters in the aforementioned embodiment may include the rotation angle, and pixel offsets along the X-axis and Y-axis. The image-generating module 1804 may randomly select values from ranges of these three parameters, and the randomly selected values are used in the image-generation process to generate the simulated check-point images. The generated simulated check-point images are stored in the directory to be generated, and the directory to be generated is different from the directory of original check-point images of the same type, thereby facilitating to distinguish the simulated check-point images from the original check-point images.

Accordingly, the image-generating module 1804 may perform image generation on the one or more group-types generated by the image-classification module 1803, so that the number of check-point images in each type of the same group is even. For example, the image-generating module 1804 may read the structured data (e.g., the first structured data) including one or more group-types generated by the image-classification module 1803, and collect statistics on the number of check-point images in each group-type. In order to allow the AI model of the model-training module 1805 to achieve better training results and model evaluation, it is better to have a greater and even number of check-point images in each group-type. For example, the user may set the number of check-point images of the selected group-type (e.g., the group-type in block 915, as shown in Table 2) to be increased by X or increased to Y through field 920 of the user interface 400 of the image-generating module 1804, so that the numbers of check-point images in different types in the same group can be even, thereby generating second structured data. In the embodiment of Table 2, four group-types in block 915 are set to increase the number of check-point images to 150.

TABLE 2

| Type name | Number |
|---|---|
| aluminum_capacitor_0 | 150 |
| aluminum_capacitor_180 | 150 |
| aluminum_capacitor_270 | 150 |
| aluminum_capacitor_90 | 150 |

Specifically, the check-point images in each group-type of group-type structured data (e.g., the first structured data) generated by the image-classification module 1803 can be regarded as original check-point images, and the check-point images randomly generated by applying different ranges of image parameters can be regarded as simulated check-point images. For example, if types Type1, Type2, and Type3 in the PASS group originally have 500, 250, and 100 original check-point images, respectively, and the target number of images set by the image-generating module 1804 is 1000 (i.e., X=1000, increased to 1000 images), after the image-generating module 1804 processes the types Type1, Type2, and Type3 in the PASS group, the number of check-point images in types Type1, Type2, and Type3 are changed to 1000. For example, the PASS-Type1 group-type may include 500 original check-point images and 500 simulated check-point images, and the PASS-Type2 group-type may include 250 original check-point images and 750 simulated check-point images, and the PASS-Type3 group-type may include 1000 original check-point images and 0 simulated check-point images. That is, after being processed by the image-generating module 1804, the number of check-point images in each type of PASS group is even. Meanwhile, the PASS group may include 3000 check-point images. Accordingly, if the sum of the number of original check-point images and the simulated check-point images in the first group is equal to a first number (e.g., 3000), the sum of the number of original check-point images and the simulated check-point images in each of the other groups is also equal to the first number.

Similarly, the image-generating module 1804 also performs a corresponding image-generating process on groups NG1, NG2, and NG3. That is, after being processed by the image-generating module 1804, each of groups NG1, NG2, and NG3 includes 3000 check-point images. If group NG1 only includes types Type1 and Type3, each of the types Type1 and Type3 includes 1500 check-point images. Similarly, group NG3 may only include types Type1 and Type2, and each of the types Type1 and Type2 includes 1500 check-point images. In addition, since group NG2 includes types Type1, Type2, and Type3, after being processed by the image-generating module 1804, each of the types Type1, Type2, and Type3 includes 1000 check-point images. In some embodiments, the image-generating module 1804 may, for example, save the simulated check-point images of each group-type generated by the image-generating process into other sub-directories to distinguish them from the original check-point images. In other words, the sum of the number of original check-point images and the number of simulated check-point images in each group of each group is equal to the first number (e.g., 3000) divided by the number of types in each group (e.g., two types are in group NG1, and 3 types are in group NG2).

In another embodiment, the user may also manually observe the simulated check-point image generated by the image-generating module 1804. In step S1030, the image is loaded. For example, the user may press button 902 to load one of the original check-point images, and the loaded original check-point image is displayed in block 916.

In step S1032, parameter adjustment is performed. For example, blocks 910 to 913 are different image-parameter settings. Block 910 may include the settings of brightness, contrast, and gamma of red, green, and blue pixels, and the user may set or adjust the currently used brightness, contrast, and gamma of the red plane (R), green plane (G), and blue plane (B) in the corresponding fields. The setting about whether to perform blurring or sharpening and corresponding blurring and scaling ratio (%) in the image-generation process can be set in block 911. The mask pattern used in the 3×3 convolution kernel operation on the original check-point image can be set in block 913, and the user can adjust the coefficients in different positions of the mask to generate a specific set of image parameters.

In step S1034, the simulated check-point image is calculated in real time using the set parameters, and in step S1036, the simulated check-point image is displayed on the image-displaying frame (e.g., block 917) of the user interface 400. For example, after the settings in block 910 to 913 are completed, a set of specific image parameters is generated, and the button 905 can be pressed to perform the image-generation process of a single image. The image-generation process may calculate the simulated check-point image using the original check-point image and the set of specific image parameters, and the generated simulated check-point image (e.g., the first simulated check-point image) can be displayed in block 917. Accordingly, the user may adjust various parameters for image generation by himself, and the image-generating module 1804 can generate the simulated check-point image according to the adjusted parameters, and can see the simulated check-point image in real time on the user interface 400.

The model-generating program 1807 may include the model-training module 1805 and the model-evaluation module 1806. For example, the image-generating module may generate the second structured data including a plurality of group-types, and the second structured data includes training-set data and testing-set data. The model-training module 1805 is configured to allow an AI model to perform model training using training-set data. The model-evaluation module 1806 is configured to evaluate the performance of the trained AI model using the testing-set data of the second structured data. That is, the testing-set data can be input into the trained AI model to obtain a model evaluation of the AI model.

For example, the training-set data and testing-set data used in the training phase of the AI model should be different, so that the AI model is less likely to produce "overfitting" when recognizing the results. In an embodiment, the second structured data generated by the image-generating module 1804 can be divided into a training-set data and a testing-set data that are stored in different directories. The model-training module 1805 can specify to read the corresponding directory of the training-set data as a source of training data. In another embodiment, the second structured data generated by the image-generating module 1804 does not specifically distinguish between training-set data and testing-set data, and the model-training module 1805 can select the directory of the second structured data, and the check-point images in each group-type of second structured data can be divided into the training-set data and testing-set data according to a preset distribution ratio of the training-set data. For example, the distribution ratio of the training-set data is 0.3, the model-training module 1805 may use 30% of the check-point images in each group-type in the second structured data as the training-set data, and the remaining 70% of check-point images in each group-type in the second structure data are used as the testing-set data.

In the embodiment, the model-training module uses "transfer learning" technology to create an AI model, wherein the AI model may, for example, include an input layer, a transfer model, a classification layer, and an output layer, and the user may set the parameters corresponding to the input layer, transfer model, classification layer, and output layer through the user interface of the AI image-recognition program 180, and the user may also set the strategic parameters of the AI model during the training phase, such as the type of optimizer, the learning rate, the number of epochs, and the batch size.

With regard to the input layer, the user may set the input image size of the input layer according to the actual size of the check-point image to be processed. When the size of the actual check-point image is different from the set input image size, the model-training module 1805 can interpolate the input check-point image to scale it to the set input image size.

The model-training module 1805 provides a variety of open-source transfer models for selection, such as Mobile-Net, ResNet, and so on. The user can choose whether to turn on the weight parameters of partial layers of the transfer model for retraining, and whether to turn on flattening to retain all information functions. The classification layer of the AI model is composed of fully-connected layers, and the user can decide how many layers to construct in the classification layer, the number of neurons in each layer, and whether each layer introduces a dropout function. With respect to the output layer of the AI model, the model-training module 1805 can automatically read the directory name of the first layer of the input data as the classification mark according to the data structure of the input data (e.g., the second structured data), thereby automatically establishing the output layer.

The model-evaluation module 1806 is configured to evaluate the performance of the AI model trained by the model-training module 1805 on the testing-set data in the second structure data, that is, the testing-set data can be input into the trained AI model to obtain a model evaluation of the AI model. In addition, the model-evaluation module 1806 can also use the AI model trained by the model-training module 1805 to perform data cleaning on the training-set data in the second structured data.

For example, during the evaluation phase of the AI model, the model-evaluation module 1806 may input each check-point image in the testing-set data into the AI model to generate a corresponding recognition result and confidence level. Then, the model evaluation module 1806 compares the recognition result of each check-point image in the testing-set data with the type labeled on each check-point image in the testing-set to obtain the model evaluation of the AI model (e.g., accuracy (or recognition rate)=the number of correct recognition results/the number of check-point images in the testing-set data). By calculating the model evaluation, the group-types with a low overall recognition rate or confidence can be found.

In an embodiment, if the model-evaluation module 1806 compares the recognition result of each check-point image in the testing-set data with the type labeled on each check-point image in the testing-set data, the recognition results of some check-point images in the testing-set data may be incorrect, but with a high degree of confidence, it can be determined that check-point images corresponding these recognition results may be labeled incorrectly. Accordingly, the model-evaluation module 1806 may perform a first data-cleaning procedure to filter out the check-point images and recognition results that may be labeled incorrectly, and delete these check-point images from the training-set data.

If the model-evaluation module 1806 compares the recognition result of each check-point image in the testing-set data with the type labeled on each check-point image in the testing-set data, the recognition results of some check-point images in the testing-set data may be correct, but the confidence is not high (e.g., below a threshold, where the threshold can be but not limited to 50%), indicating that the corresponding check-point image in the testing-set data may have multiple labels. That is, the same check-point image may be labeled with different group-types, so the confidence of the recognition result of the AI model will be low. Accordingly, the model-evaluation module 1806 may perform a second data-cleaning procedure to filter out the check-point images with low confidence in the testing-set data, and delete the check-point images, that correspond to the check-point images in the testing-set data, from the training-set data.

After the model-evaluation module 1806 has executed the first data-cleaning procedure and second data-cleaning procedure and has updated the training-set data, the AI image-recognition program 180 may then execute the image-labeling module 1802 to check the filtered check-point images one by one for re-labeling. If a specific check-point image will cause the AI model to misjudge in different group-types, it is inappropriate to re-label the specific check-point image and put the specific check-point back to the training-set data, and thus the image-labeling module 1802 deletes the specific check-point image. In addition, the AI image-recognition program 180 may re-execute the image-generating module 1804 to further check the number of check-point images in the group-types having a lower recognition rate and/or confidence level, and generate proper simulated check-point images for these group-types to update the second structured data. Accordingly, after updating the second structured data, the model-training module 1805 may divide a new training-set data from the updated second structured data to retrain the AI model, thereby improving the recognition rate and confidence level of the recognition result of the AI model.

Figure 11:
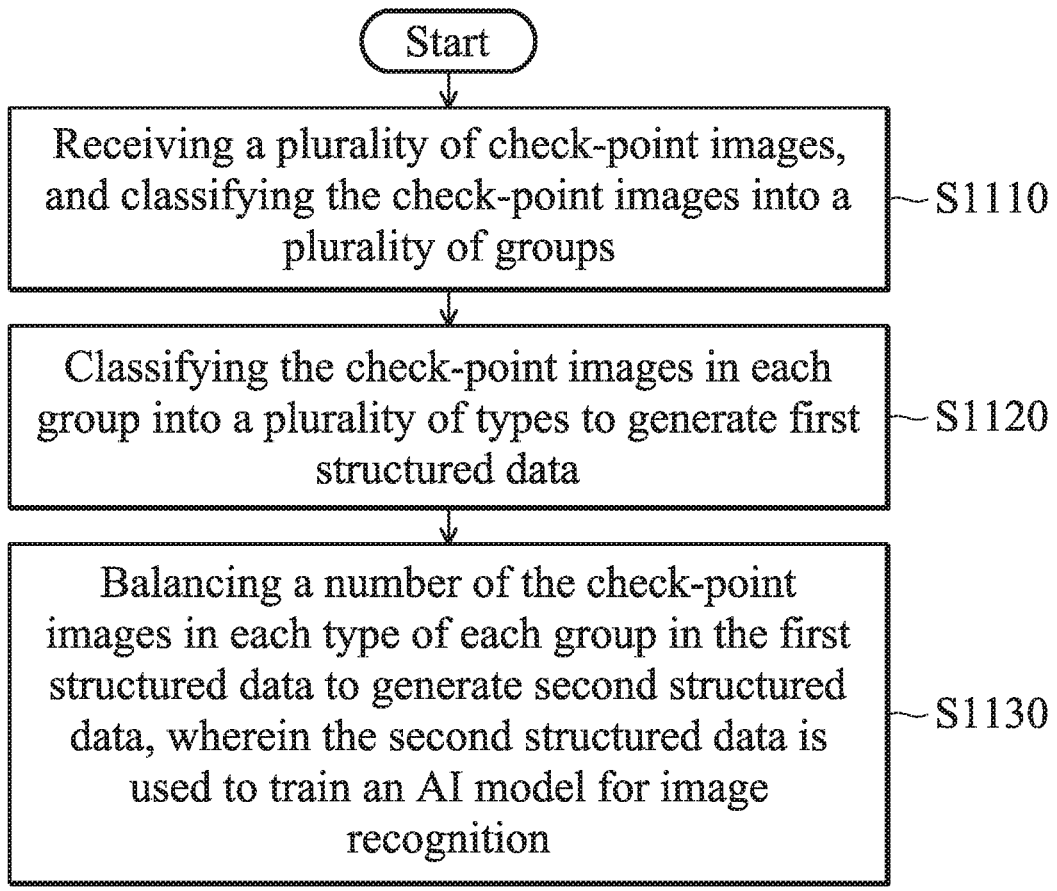
FIG. 11 is a flow chart of an image-recognition method in accordance with an embodiment of the disclosure.

FIG. 11 is a flow chart of an image-recognition method in accordance with an embodiment of the disclosure.

Referring to FIG. 2 and FIG. 11, in step S1110, a plurality of check-point images are received, and the check-point images are divided into a plurality of groups. For example, the source of the check-point images may be check-point images from the AOI device 14, that is, the AOI device 14 has first divided the object image of the DUT into the check-point image corresponding to each check point of the DUT, and the check-point images are transmitted to the image-recognition apparatus 18. The source of the check-point images may also be the object image of the DUT from the AOI device 14. Accordingly, the image-dividing module 1801 of the image-recognition apparatus 18 may divide the object image into the check-point image corresponding to each check point of the DUT. In addition, the image-labeling module 1802 may add a group label on each check-point image to classify the check-point images into a plurality of groups, such as the pass status (e.g., PASS) and defective statuses (e.g., NG1, NG2, and NG3). It should be noted that when the image-labeling module 1802 is labeling the groups, types of different components on the DUT are temporarily not considered.

In step S1120, the check-point images in each group are divided into a plurality of types to generate first structured data. For example, the image-classification module 1803 may classify the check-point images in each group into one or more types according to similarities of the check-point images to generate the first structured data.

In step S1130, the number of check-point images in each type of each group in the first structured data is balanced to generate second structured data, wherein the second structured data is used to train an AI model for image recognition. For example, the check-point images in each group-type of the group-type structured data (e.g., the first structured data) generated by the image-classification module 1803 can be regarded as original check-point images, and the check-point images randomly generated by applying different ranges of image parameters can be regarded as simulated check-point images. After the first structured data is processed by the image-generating module 1804, each of different types in the same group of the second structured data may have the same total number of original check-point images and simulated check-point images. The second structured data can be used to train an AI model for image recognition.

In view of the above, an image-recognition apparatus, an image-recognition method, and a computer program product thereof are provided in the disclosure. The image-recognition apparatus, image-recognition method, and computer program product thereof are capable of creating first structured data using the check-point images that are originally input to an AI model through standardization steps of image labeling, image classification, and image generation, and the number of check-point images in each type of each group of the first structured data can be increased and balanced to generate second structured data. The second structured data can solve the program of the AI model requiring a large and balanced amount of samples during the training phase. Accordingly, the AI model trained using the second structured data can increase the recognition rate and confidence level of the AI model. In addition, the effect of reducing the workload of the product line operators and reducing production costs can be achieved.

While the disclosure has been described by way of example and in terms of the preferred embodiments, it should be understood that the disclosure is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A computer program product comprising a non-transitory computer-readable storage medium storing an artificial-intelligence image-recognition program which is executed by a computer to cause the computer to function as:
  an image-labeling module, configured to receive a plurality of check-point images, and classify the check-point images into a plurality of groups;
  an image-classification module, configured to classify the check-point images in each group into a plurality of types to generate first structured data, wherein the first structured data comprises a first layer and a second layer, and the first layer indicates the groups in different statuses, the second layer is located within directories of the first layer, and the types in each group of the second layer indicate different components in a status corresponding to each group; and
  an image-generating module, configured to balance a number of check-point images in each type of each group in the first structured data to generate second structured data, wherein the second structured data is used to train an AI model for image recognition.

2. The computer program product as claimed in claim 1, further comprising:
  an image-dividing module, configured to receive an object image of a device under test (DUT) from an automated-optical-inspection (AOI) apparatus, and divide the object image into the check-point images corresponding to a plurality of check points on the DUT.

3. The computer program product as claimed in claim 2, wherein the image-dividing module sets a search range on the object image, and sets one or more labeling ranges within the search range, and sets relative positions for different check points within each labeling range,
  wherein the image-dividing module searches the one or more labeling ranges within the search range, and divide the object image into the check-point images corresponding to the check points according to the relative position of each check point within the corresponding labeling range.

4. The computer program product as claimed in claim 1, wherein the check-point images are from an AOI apparatus, and the check-point images correspond to a plurality of check points of a DUT captured by the AOI apparatus.

5. The computer program product as claimed in claim 1, wherein each group labeled by the image-labeling module corresponds to a plurality of defective statuses and a pass status of a plurality of check points on a DUT.

6. The computer program product as claimed in claim 1, wherein the image-classification module classifies the check-point images in each group into the types to generate the first structured data according to similarities of the check-point images in each group.

7. The computer program product as claimed in claim 6, wherein in response to the similarity between each check-point image in each group and one or more reference images in a specific type being higher than a similarity threshold, the image-classification module classifies the check-point images in each group having similarities higher than the similarity threshold into the specific type.

8. The computer program product as claimed in claim 6, wherein the image-classification module sorts the similarity of each check-point image in each group corresponding to at least one of the types, and displays a sorting result on a user interface,
  wherein after the image-classification module has labeled the one or more check-point images in each group, the image-classification module moves the labeled one or more check-point images to corresponding sub-directories to be classified.

9. The computer program product as claimed in claim 6, wherein each type in each group of the first structured data records corresponding serial numbers of the check-point images, which is output as a classification file by the image-classification module.

10. The computer program product as claimed in claim 1, wherein the image-generating module sets a variation range of each of one or more image parameters, and the image-generating module randomly generates each image parameter from the variation range of each image parameter to perform image processing on the check-point images to generate a plurality of simulated check-point images.

11. The computer program product as claimed in claim 10, wherein the one or more image parameters comprise brightness, contrast, and gamma of red pixels, green pixels, and blue pixels of the original check-point images, a rotation angle, pixel offsets along the X-axis and Y-axis, sharpness, blurriness, and a scaling ratio.

12. The computer program product as claimed in claim 11, wherein the image-generating module calculates a first simulated check-point image using an original check-point image and a set of specific image parameters, and displays the first simulated check-point image on the user interface.

13. The computer program product as claimed in claim 10, wherein there is a first number of check-point images and simulated check-point images in each group of the second structure data generated by the image-generating module, and a second number of check-point images and simulated check-point images in each type of each group is obtained by dividing the first number by a number of types in each group.

14. An image-recognition method, comprising:
  receiving a plurality of check-point images, and classifying the check-point images into a plurality of groups;
  classifying the check-point images in each group into a plurality of types to generate first structured data, wherein the first structured data comprises a first layer and a second layer, and the first layer indicates the groups in different statuses, the second layer is located within directories of the first layer, and the types in each group of the second layer indicate different components in a status corresponding to each group; and
  balancing a number of the check-point images in each type of each group in the first structured data to generate second structured data, wherein the second structured data is used to train an AI model for image recognition.

15. An image-recognition apparatus, comprising:
  a non-volatile memory, configured to store an artificial-intelligence (AI) image-recognition program; and a processor, configured to execute the AI image-recognition program to perform the following steps:

receiving a plurality of check-point images, and classifying the check-point images into a plurality of groups;

classifying the check-point images in each group into a plurality of types to generate first structured data, wherein the first structured data comprises a first layer and a second layer, and the first layer indicates the groups in different statuses, the second layer is located within directories of the first layer, and the types in each group of the second layer indicate different components in a status corresponding to each group; and balancing a number of the check-point images in each type of each group in the first structured data to generate second structured data, wherein the second structured data is used to train an AI model for image recognition.

* * * * *